United States Patent
Venkataramani et al.

(10) Patent No.: US 12,423,567 B2
(45) Date of Patent: Sep. 23, 2025

(54) TRAINING CONVOLUTION NEURAL NETWORK ON ANALOG RESISTIVE PROCESSING UNIT SYSTEM

(71) Applicant: International Business Machines Corporation, Armonk, NY (US)

(72) Inventors: Swagath Venkataramani, White Plains, NY (US); Shubham Jain, Elmsford, NY (US); Leland Chang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 17/485,073

(22) Filed: Sep. 24, 2021

(65) Prior Publication Data

US 2023/0099608 A1    Mar. 30, 2023

(51) Int. Cl.
*G06N 3/065*    (2023.01)
*G06F 17/16*    (2006.01)
(Continued)

(52) U.S. Cl.
CPC .............. *G06N 3/065* (2023.01); *G06F 17/16* (2013.01); *G06N 3/084* (2013.01); *G06G 7/16* (2013.01)

(58) Field of Classification Search
CPC ........... G06G 7/16; G06F 17/16; G06F 17/15; G06F 17/153; G06F 17/144;
(Continued)

(56) References Cited

U.S. PATENT DOCUMENTS 10,073,816 B1    9/2018  Lu et al.
10,482,155 B2    11/2019  Werner et al.
(Continued)

OTHER PUBLICATIONS

Lin, Jilan. "CNNWire: Boosting Convolutional Neural Network with Winograd on ReRAM Based Accelerators." ACM Conferences, May 13, 2019, dl.acm.org/doi/10.1145/3299874.3318018. (Year: 2019).*
P. Chi et al., "Prime: A Novel Processing-in-Memory Architecture for Neural Network Computation in ReRAM-Based Main Memory,"2016 ACM/IEEE 43rd Annual International Symposium on Computer Architecture (ISCA), Seoul, Korea (South), 2016, pp. 27-39 (Year: 2016).*
(Continued)

*Primary Examiner* — Jyoti Mehta
*Assistant Examiner* — Huy Duong
(74) *Attorney, Agent, or Firm* — Andre L. Adkins; Ryan, Mason & Lewis, LLP

(57) ABSTRACT

A system comprises an analog resistive processing unit (RPU) system, and one or more processors. The analog RPU system comprises an array of RPU cells. The one or more processors are configured to: configure the analog RPU system to implement a convolutional neural network comprising a convolutional layer comprising at least one kernel matrix; program the at least one array of RPU cells to store a transformed kernel matrix which is generated by applying a first transformation process to the kernel matrix using a first predefined transformation matrix; and utilize the analog RPU system to perform an analog convolution operation by performing analog matrix-vector multiplication operations using the transformed kernel matrix and input vectors of a transformed data matrix, to thereby generate a transformed convolution output matrix, wherein the transformed data matrix is generated by applying a second transformation process to a data matrix using a second predefined transformation matrix.

20 Claims, 16 Drawing Sheets

(51) Int. Cl.
*G06G 7/16* (2006.01)
*G06N 3/084* (2023.01)

(58) Field of Classification Search
CPC .... G06F 15/7821; G06F 15/785; G06F 7/523; G06F 7/5443; G06N 3/04; G06N 3/08; G06N 3/063; G06N 3/084; G06N 3/0464; G06N 3/065
See application file for complete search history.

(56) References Cited

U.S. PATENT DOCUMENTS

| | | | |
|---|---|---|---|
| 2017/0316828 A1* | 11/2017 | Hu | G06F 17/16 |
| 2017/0344876 A1* | 11/2017 | Brothers | G06F 17/153 |
| 2018/0075338 A1* | 3/2018 | Gokmen | G06N 3/045 |
| 2019/0114536 A1 | 4/2019 | Tsung et al. | |
| 2019/0130250 A1 | 5/2019 | Park et al. | |
| 2019/0179869 A1* | 6/2019 | Park | G06F 12/0802 |
| 2019/0205741 A1* | 7/2019 | Gupta | G06F 9/3853 |
| 2019/0392297 A1 | 12/2019 | Lau et al. | |
| 2020/0019851 A1* | 1/2020 | Mehrabian | G06N 3/067 |
| 2020/0151541 A1 | 5/2020 | Meng et al. | |
| 2020/0234124 A1* | 7/2020 | Park | G06N 3/048 |
| 2021/0073650 A1* | 3/2021 | Reisser | G06N 3/065 |
| 2021/0089610 A1* | 3/2021 | Kwon | G06F 17/16 |
| 2022/0414183 A1* | 12/2022 | Zhang | G06N 3/063 |

OTHER PUBLICATIONS

T. Gokem et al., "Acceleration of Deep Neural Network Training with Resistive Cross-Point Devices: Design Considerations," Frontiers in Neuroscience, vol. 10, No. 333, Jul. 2016, 13 pages.

T. Gokem et al., "Training Deep Convolutional Neural Networks with Resistive Cross-Point Devices," Frontiers in Neuroscience, vol. 11, No. 538, Oct. 2017, 13 pages.

X. Liu et al., "Efficient Sparse-Winograd Convolutional Neural Networks," arXiv:1802.06367v1, Feb. 18, 2018, 10 pages.

A. Lavin et al., "Fast Algorithms for Convolutional Neural Networks," arXiv:1509.09308v2, Nov. 10, 2015, 9 pages.

M. Mathieu et al., "Fast Training of Convolutional Networks through FFTs," arXiv:1312.5851v5, Mar. 6, 2014, 9 pages.

N. Vasilache et al., "Fast Convolutional Nets with fbfft: A GPU Performance Evaluation," arXiv:1412.7580v3, Apr. 10, 2015, 17 pages.

M. Rasch et al. "Efficient ConvNets for Analog Arrays," arXiv:1807.01356v1, Jul. 3, 2018, 12 pages.

P. Mell et al., "The NIST Definition of Cloud Computing," Recommendations of the National Institute of Standards and Technology, Special Publication 800-145, Sep. 2011, 7 pages.

S. Winograd, "Arithmetic Complexity of Computations," vol. 33, Society for Industrial and Applied Mathematics, Third Printing 1990, 100 pages.

\* cited by examiner

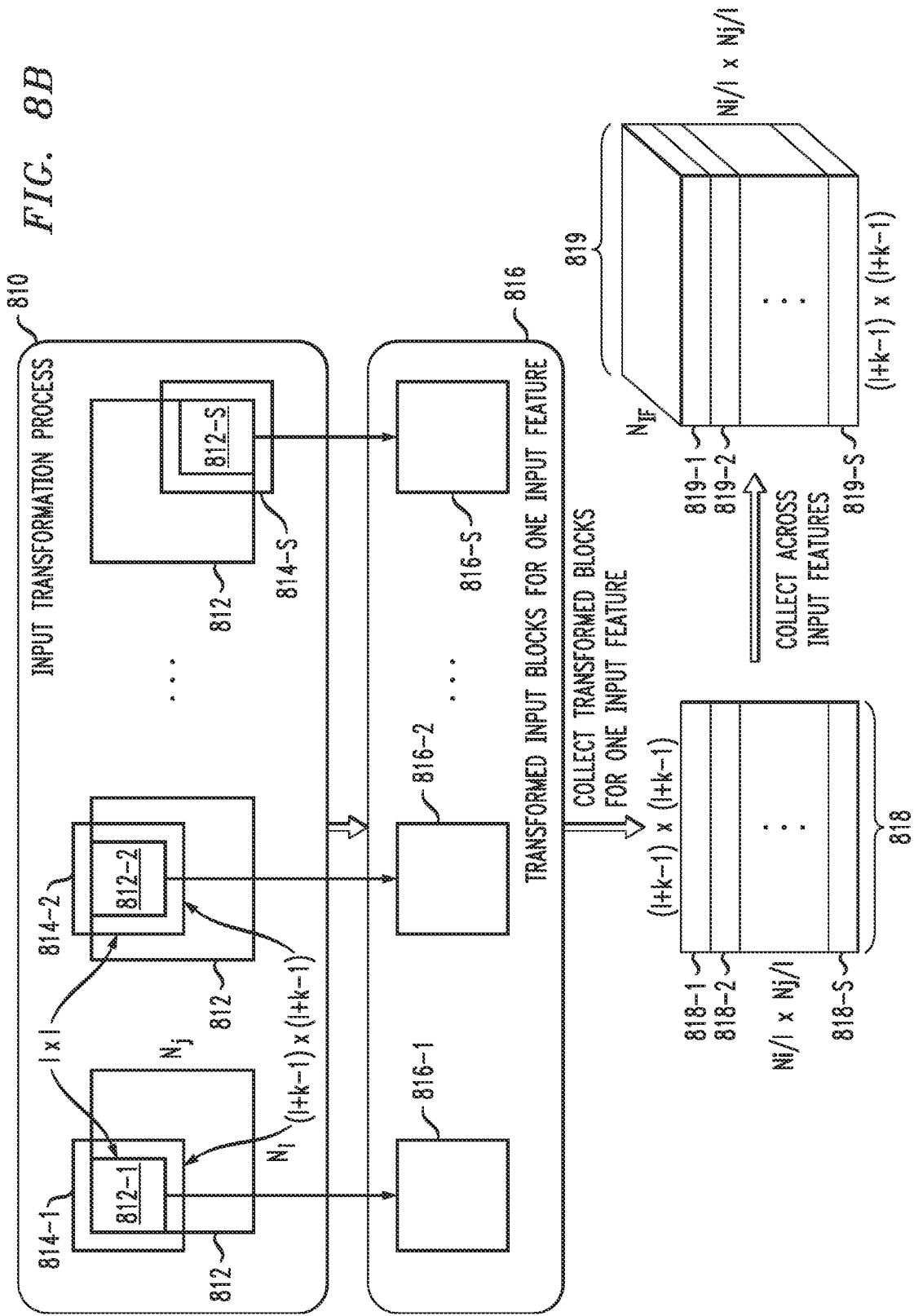

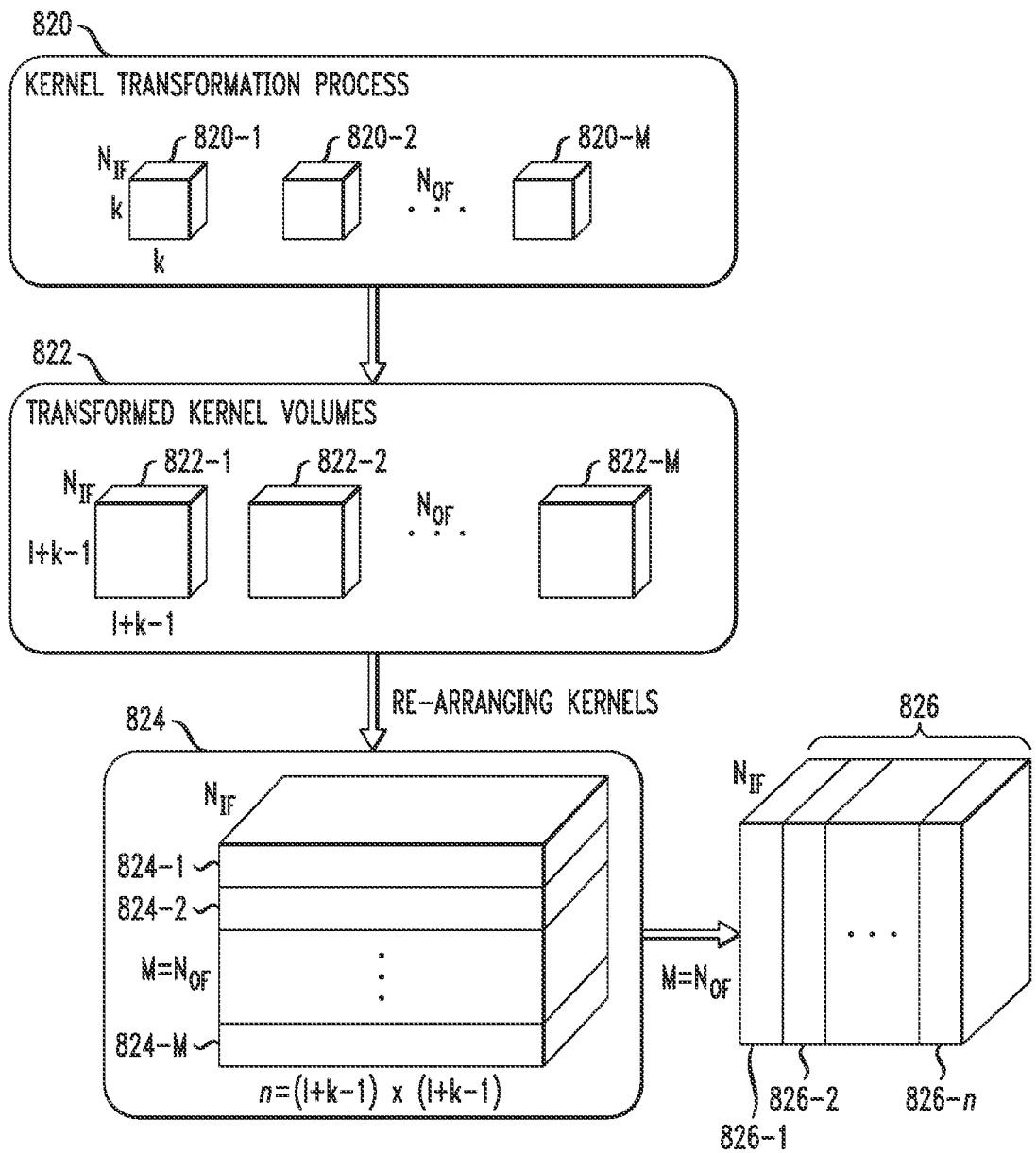

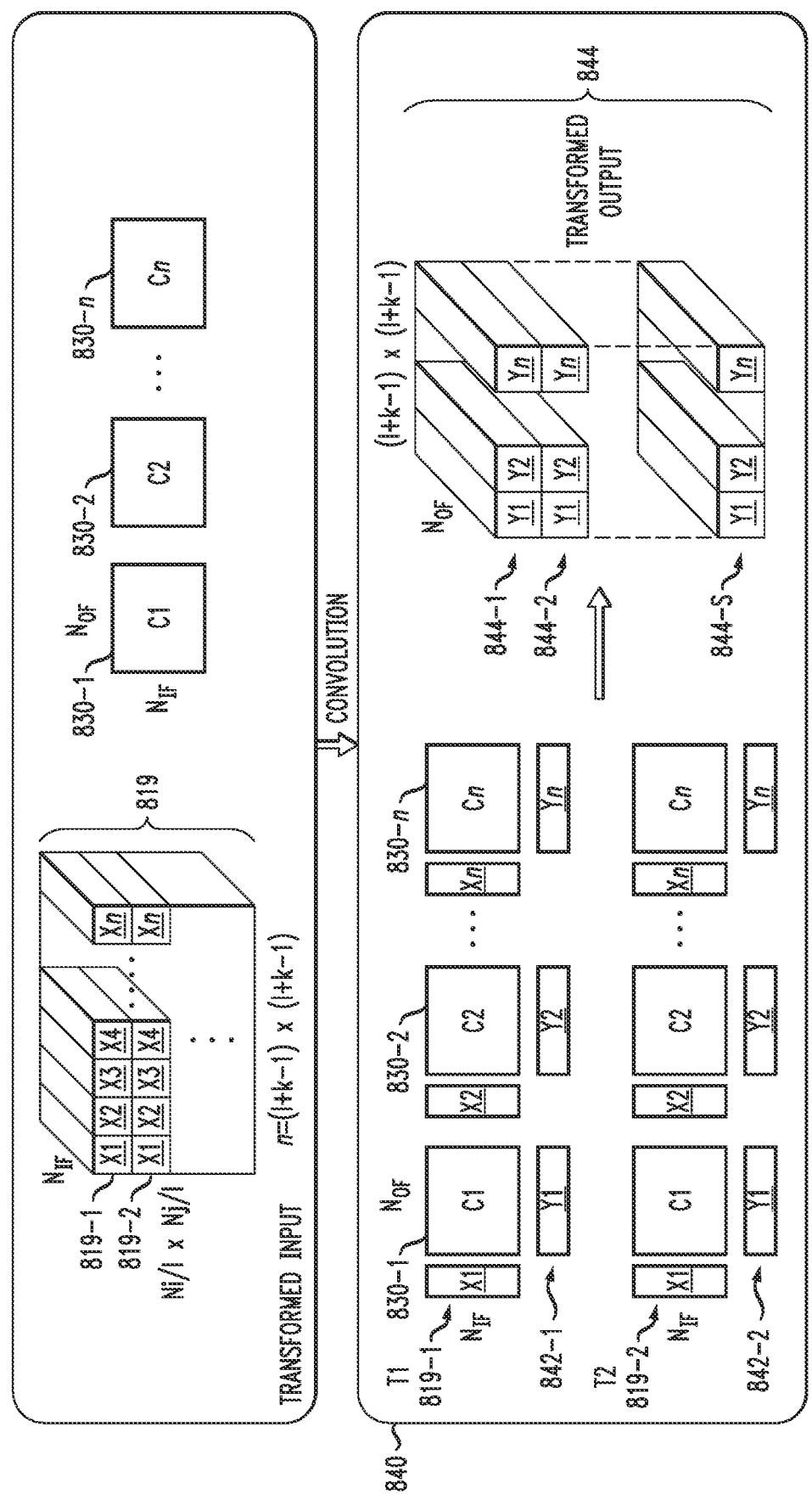

BACKWARD PASS
(ERROR PROPAGATION)
870

WEIGHT UPDATE
880

$$W_{ij} = W_{ij} \pm \Delta W_{min} \sum X_i \wedge E_j$$

FIG. 9
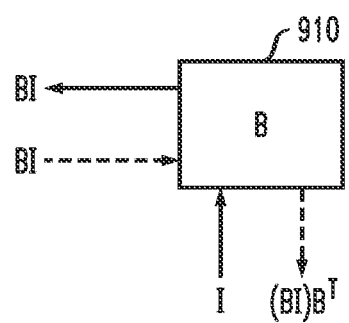
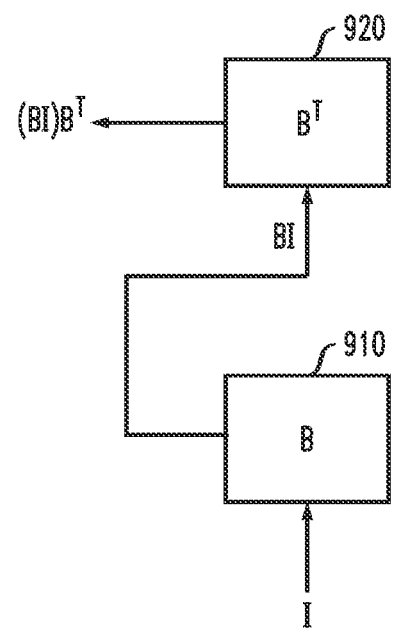

TRAINING CONVOLUTION NEURAL NETWORK ON ANALOG RESISTIVE PROCESSING UNIT SYSTEM

BACKGROUND

This disclosure relates generally to analog resistive processing unit (RPU) systems for neuromorphic computing and, in particular, to techniques for training artificial neural networks using analog RPU systems. Information processing systems such as neuromorphic computing systems and artificial neural network systems are utilized in various applications such as machine learning and inference processing for cognitive recognition and computing. Such systems are hardware-based systems that generally include a large number of highly interconnected processing elements (referred to as "artificial neurons") which operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of RPU cells having tunable resistive memory devices (e.g., tunable conductance), wherein the conductance states of the RPU cells are encoded or otherwise mapped to the synaptic weights.

SUMMARY

Embodiments of the disclosure include techniques for training an artificial neural network on an analog resistive processing unit system and, in particular, techniques for training convolutional neural networks on an analog resistive processing unit system using fast filtering functions such as, but not limited to, Winograd filtering functions.

An exemplary embodiment includes a system which comprises an analog resistive processing unit system, and one or more processors. The analog resistive processing unit system comprises at least one array of resistive processing unit cells. The one or more processors are configured to: configure the analog resistive processing unit system to implement a convolutional neural network comprising a convolutional layer, wherein the convolution layer comprises at least one kernel matrix; program the at least one array of resistive processing unit cells to store a transformed kernel matrix, wherein the transformed kernel matrix is generated by applying a first transformation process to the at least one kernel matrix using a first predefined transformation matrix; and utilize the analog processing unit system to perform an analog convolution operation by performing analog matrix-vector multiplication operations using the transformed kernel matrix and input vectors of a transformed data matrix, to thereby generate a transformed convolution output matrix, wherein the transformed data matrix is generated by applying a second transformation process to a data matrix using a second predefined transformation matrix.

Other embodiments will be described in the following detailed description of exemplary embodiments, which is to be read in conjunction with the accompanying figures.

BRIEF DESCRIPTION OF THE DRAWINGS

FIGS. 8A, 8B, 8C, 8D, 8E, 8F, 8G, 8H, and 8I schematically illustrate a method for training a convolutional neural network model on an analog resistive processing unit system using a Winograd filtering function for convolution operations, and a backpropagation training process, according to an exemplary embodiment of the disclosure, wherein:

FIG. 8A schematically illustrates an input data volume, a plurality of convolutional kernels of a convolution layer, and transformation matrices which can be utilized to transform the input data volume and convolutional kernels to enable training of a convolutional neural network on an analog resistive processing unit system using a Winograd filtering function, according to an exemplary embodiment of the disclosure;

FIG. 8B schematically illustrates a process for applying a transformation function to an input data volume to generate a transformed input volume for training a convolutional neural network on an analog resistive processing unit system using a Winograd filtering function, according to an exemplary embodiment of the disclosure;

FIG. 8C schematically illustrates a process for applying a transformation function to a set of convolutional kernels of a convolutional layer to generate a set of transformed kernels for training a convolutional neural network on an analog resistive processing unit system using a Winograd filtering function, according to an exemplary embodiment of the disclosure;

FIG. 8D schematically illustrates a process for mapping a set of transformed kernels to corresponding resistive processing unit crossbar arrays for training a convolutional neural network on an analog resistive processing unit system using a Winograd filtering function, according to an exemplary embodiment of the disclosure;

FIG. 8E schematically illustrates a process for performing convolution operations using a Winograd filtering function in a forward pass cycle of a backpropagation training process by performing matrix-vector multiplication operations on the resistive processing unit crossbar arrays to apply the set of transformed kernels to the transformed input volume and generate a transformed output volume, according to an exemplary embodiment of the disclosure;

FIG. 8F schematically illustrates a process for applying an inverse transformation function to the transformed output volume to generate an output volume in a spatial domain, according to an exemplary embodiment of the disclosure;

FIG. 8G schematically illustrates a process of transforming an error gradient volume to a transformed error gradient volume which is utilized for performing a backward pass operation of a backpropagation training process, according to an exemplary embodiment of the disclosure;

FIG. 8H schematically illustrates a process for performing a backward pass operation to backpropagate a transformed error gradient volume through layers of a convolution neural network, according to an exemplary embodiment of the disclosure; and FIG. 8I schematically illustrates a process for updating kernel parameters of the transformed kernels stored in resistive processing unit crossbar arrays, according to an exemplary embodiment of the disclosure.

FIG. 9 schematically illustrates methods for performing transformation functions using transformation matrices that are stored in analog resistive processing unit crossbar arrays, according to exemplary embodiments of the disclosure.

DETAILED DESCRIPTION

Embodiments of the disclosure will now be discussed in further detail with regard to systems and methods for training an artificial neural network on an analog resistive processing unit system and, in particular, systems and methods for training convolutional neural networks on an analog resistive processing unit system using fast filtering functions such as Winograd filtering functions.

It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., application specific integrated circuit (ASIC) chips, field-programmable gate array (FPGA) chips, etc.), processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
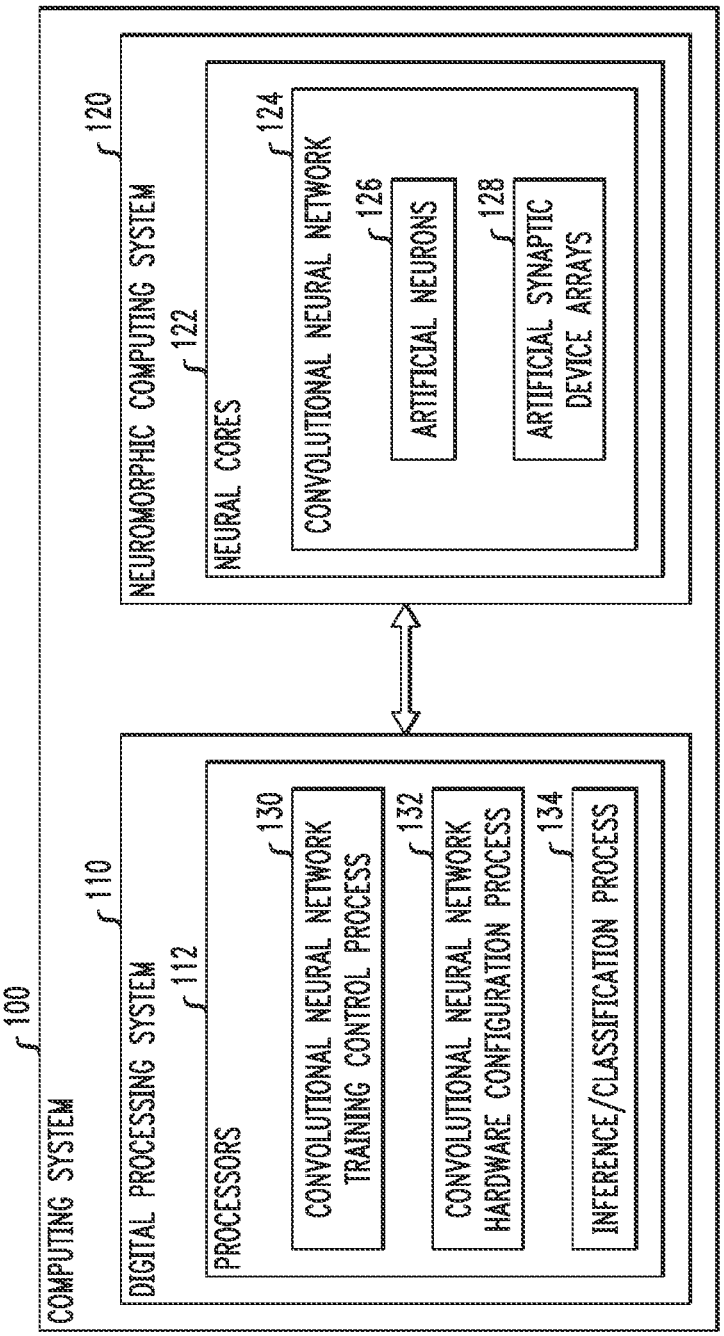
FIG. 1 schematically illustrates a computing system for training a convolutional neural network on an analog resistive processing unit system, according to an exemplary embodiment of the disclosure.

FIG. 1 schematically illustrates a computing system for training a convolutional neural network on an analog resistive processing unit system, according to an exemplary embodiment of the disclosure. In particular, FIG. 1 schematically illustrates a computing system 100 which comprises a digital processing system 110, and a neuromorphic computing system 120. The digital processing system 110 comprises a plurality of processors 112. The neuromorphic computing system 120 comprises a plurality of neural cores 122. The neural cores 122 are configured to implement a convolutional neural network 124 which comprises artificial neurons 126 and artificial synaptic device arrays 128. An exemplary architecture of a convolutional neural network will be explained in further detail below in conjunction with FIG. 6. In some embodiments, as explained in further detail below, the neuromorphic computing system 120 comprises an RPU system in which the neural cores 122 are implemented using one or more of RPU devices (e.g., RPU accelerator chips) and RPU compute nodes.

In some embodiments, the digital processing system 110 performs various methods through execution of program code by the processors 112. The processors 112 may include various types of processors that perform processing functions based on software, hardware, firmware, etc. For example, the processors 112 may comprise any number and combination of CPUs, ASICs, FPGAs, GPUs, Microprocessing Units (MPUs), deep learning accelerator (DLA), artificial intelligence (AI) accelerators, and other types of specialized processors or coprocessors that are configured to execute one or more fixed functions. The digital processing system 110 and processors 112 can be implemented on a single compute node, or implemented on a plurality of compute nodes that are distributed over a communications network.

The digital processing system 110 executes various processes including, but not limited to, a convolutional neural network training process 130, a convolutional neural network hardware configuration process 132, and an inference/classification process 134. In particular, the processors 112 of the digital processing system 110 are configured to execute the convolutional neural network training control process 130 to control the execution of a process for training a convolutional neural network model on an analog resistive processing unit system using a Winograd filtering function for convolution operations, and a backpropagation training process for training the parameters of convolution filters (e.g., kernels) of convolutional layers, which are stored in resistive processing unit arrays.

As is known in the art, a Winograd filtering process is a fast algorithm which is used with convolutional neural networks to decrease the latency in performing convolution operations by reducing the number of multiplication operations that are needed for the convolution operations. The Winograd filtering process utilizes predefined transformation matrices to transform input data and kernels from a spatial domain to a transformed domain, wherein the convolution operations are applied in the transformed domain, and the convolution output is transformed back to the spatial domain using an inverse transformation function. As explained in further detail below, exemplary embodiments of the disclosure utilize an analog resistive processing unit system to accelerate Winograd transformation functions and convolution operations for purposes of, e.g., training a convolutional neural network, and utilizing a trained convolutional neural network implemented on the analog resistive processing unit system to accelerate inference/classification processing.

In some embodiments, as noted above, the convolutional neural network training control process 130 implements a backpropagation process for training a convolutional neural network model. As is known in the art, the backpropagation process comprises three repeating processes including (i) a forward process, (ii) a backward process, and (iii) a model parameter update process. During the digital training process, training data are randomly sampled into mini-batches, and the mini-batches are input to the model to traverse the model in two phases: forward and backward passes. The forward pass generates predictions and calculates errors between the predictions and the ground truth. The backward pass backpropagates errors through the model to obtain gradients to update model weights. The forward and backward cycles mainly involve performing matrix-vector multiplication operations in forward and backward directions. The weight update involves performing incremental weight updates for weight values of the synaptic weight matrices of the neural network model being trained. The processing of a given mini-batch via the forward and backward phases is referred to as an iteration, and an epoch is defined as performing the forward-backward pass through an entire training dataset. The training process iterates multiple epochs until the model converges to a convergence criterion. In some embodiments, a stochastic gradient descent (SGD) process is utilized to train artificial neural networks using the backpropagation method in which an error gradient with respect to each model parameter (e.g., weight) is calculated using the backpropagation algorithm.

The processors 112 of the digital processing system 110 are configured to execute the convolutional neural network hardware configuration process 132 for configuring the neural cores 122 of the neuromorphic computing system 120 to implement the architecture of the convolutional neural network 124 on the hardware of the neuromorphic computing system 120 (e.g., resistive processing unit system), and to configure one or more analog RPU crossbar arrays to store the predefined Winograd transformation matrices that are used to perform Winograd transformation operation in the analog domain. For example, as explained in further detail below, the convolutional neural network hardware configuration process 132 is configured to program the artificial synaptic device arrays 128 (e.g., analog RPU crossbar arrays) with initial kernel parameters for kernels associated with convolutional layers of the convolutional neural network 124.

The processors 112 of the digital processing system 110 are configured to execute the inference/classification process 134 to perform an inference/classification process using the trained convolutional neural network 124 that is implemented in hardware. The inference/classification process 134 may be implemented using the trained artificial neural network 140 for applications such as machine learning and inference processing for cognitive computing tasks such as object recognition, image recognition, speech recognition, handwriting recognition, natural language processing, etc.

Figure 2:
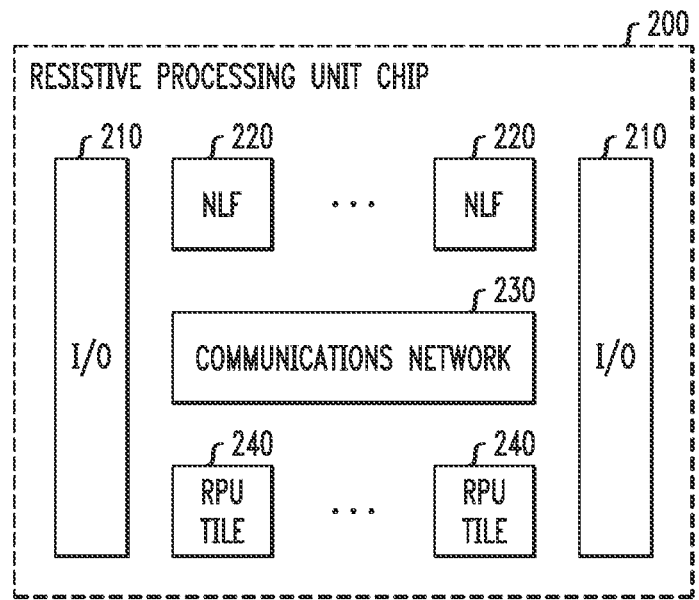
FIG. 2 schematically illustrates a resistive processing unit device which can be implemented in the system of FIG. 1, according to an exemplary embodiment of the disclosure.

As noted above, in some embodiments, the neuromorphic computing system 120 comprises an RPU system in which the neural cores 122 are implemented using one or more of RPU devices (e.g., RPU accelerator chips) and RPU compute nodes. For example, FIG. 2 schematically illustrates a resistive processing unit device 200 (or RPU chip 200) which can be implemented in the neuromorphic computing system 120 of FIG. 1, according to an exemplary embodiment of the disclosure. In some embodiments, the neural cores 122 can be implement using one or more of the RPU device 200 shown in FIG. 2. The RPU device 200 comprises an I/O interface 210, a plurality of non-linear function (NLF) compute modules 220, an intranode communications network 230, and a plurality of RPU tiles 240.

The I/O interface 210 comprises circuitry to enable off-chip I/O communication. Each RPU tile 240 comprises an array RPU cells (or RPU array) with peripheral circuitry. An exemplary embodiment of the RPU tiles 240 will be described in further detail below with reference to FIG. 4. The signals that are output from an RPU tile are directed to a non-linear function (NLF) circuit that calculates either activation functions (i.e., sigmoid, softmax) and their derivatives as well as arithmetical operations (i.e., multiplication) depending on cycle type and on position of corresponding layer. For example, for neurons in hidden layers, the NLF compute modules 220 may compute a sigmoid activation function. Neurons at an output layer, may perform a softmax NLF operation. The communications network 230 enables on-chip communication through a bus or any suitable network-on-chip (NoC) communications framework.

Figure 3:
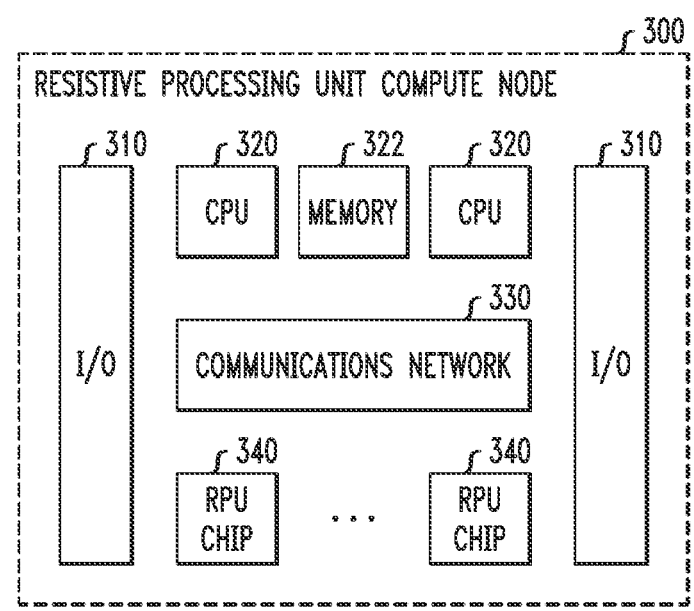
FIG. 3 schematically illustrates a resistive processing unit compute node comprising a plurality of resistive processing unit devices, which can be implemented in the system of FIG. 1, according to an exemplary embodiment of the disclosure.

FIG. 3 schematically illustrates a resistive processing unit compute node 300 comprising a plurality of resistive processing unit accelerator devices, which can be implemented in the system of FIG. 1, according to an exemplary embodiment of the disclosure. In some embodiments, one or more of the nodes 122 of the neuromorphic computing system 120 of FIG. 1 comprises a RPU compute node 300 shown in FIG. 3. The RPU compute node 300 comprises I/O interfaces 310, one or more processors 320 (e.g., CPUs), memory 322, a communications network 330, and one or more RPU chips 340. In some embodiments, each RPU chip 340 comprises the RPU accelerator device 200 of FIG. 2.

Figure 4:
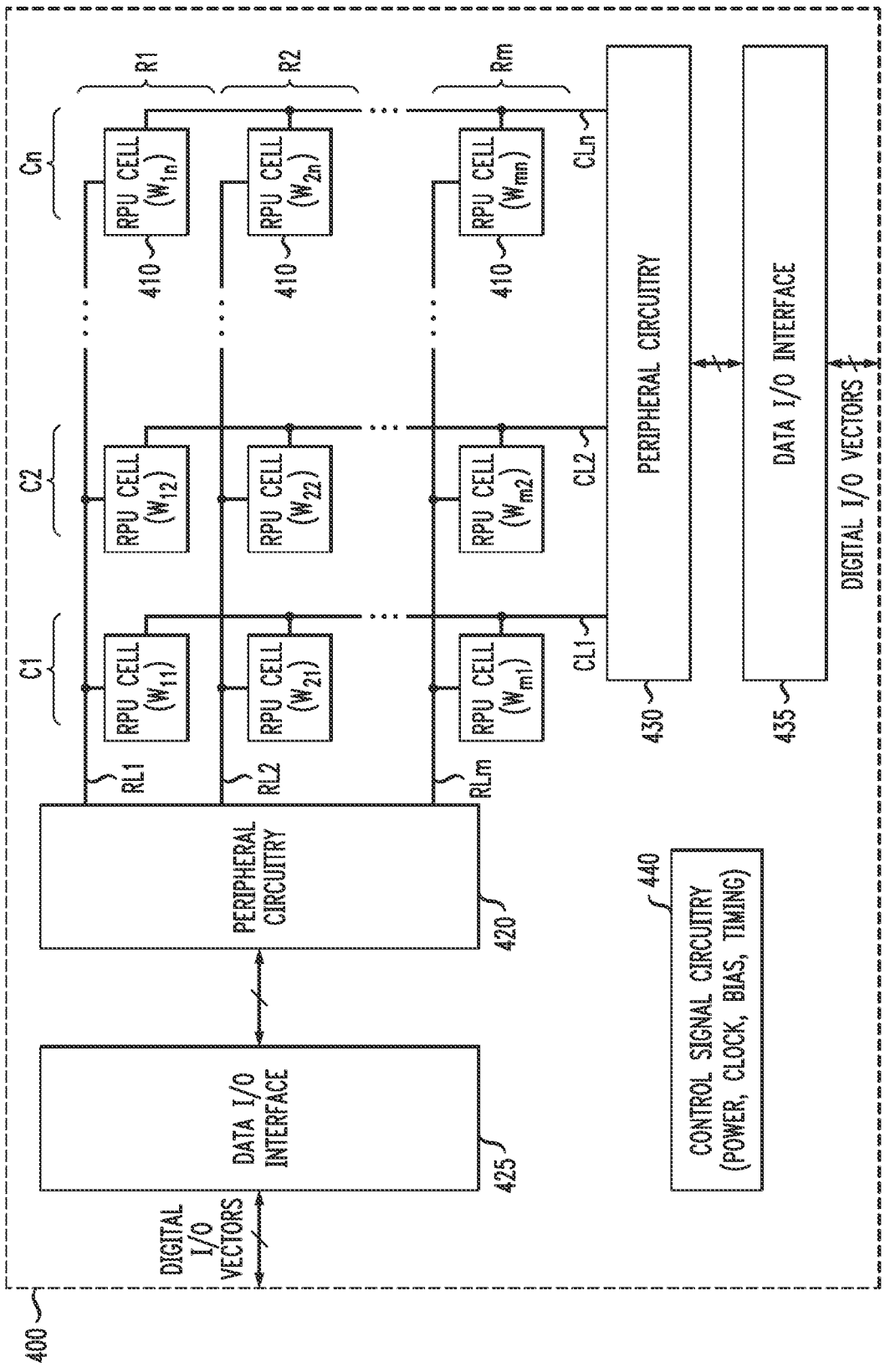
FIG. 4 schematically illustrates a resistive processing unit device which can be utilized to train a convolutional neural network, according to an exemplary embodiment of the disclosure.

FIG. 4 schematically illustrates a resistive processing unit system 400 which can be implemented in the system of FIG. 1, according to an exemplary embodiment of the disclosure. In some embodiments, FIG. 4 schematically illustrates an exemplary embodiment of the RPU tiles 240 of the RPU device 200 of FIG. 2. The RPU system 400 comprises a two-dimensional (2D) crossbar array of RPU cells 410 (alternatively referred to as RPU array) arranged in a plurality of rows R1, R2, . . . , Rm, and a plurality of columns C1, C2, . . . , Cn. The RPU cells 410 in each row R1, R2, . . . , Rm are commonly connected to respective row control lines RL1, RL2, . . . , RLm (collectively, row control lines RL). The RPU cells 410 in each column C1, C2, . . . , Cn are commonly connected to respective column control lines CL1, CL2, . . . , CLn (collectively, column control lines CL). Each RPU cell 410 is connected at (and between) a cross-point (or intersection) of a respective one of the row and column control lines. In an exemplary embodiment, the number of rows (m) and the number of columns (n) are the same (i.e., n=m). For example, in some embodiments, the RPU system 400 comprises a 4,096×4,096 array of RPU cells 410.

The RPU system 400 further comprises peripheral circuitry 420 connected to the row control lines RL1, RL2, ..., RLm, as well peripheral circuitry 430 connected to the column control lines CL1, CL2, ..., CLn. Further, the peripheral circuitry 420 is connected to a data input/output (I/O) interface block 425, and the peripheral circuitry 430 is connected to a data I/O interface block 435. The RPU system 400 further comprises control signal circuitry 440 which comprises various types of circuit blocks such as power, clock, bias and timing circuitry to provide power distribution and control signals and clocking signals for operation of the peripheral circuitry 420 and 430.

In some embodiments, each RPU cell 410 in the RPU system 400 comprises a resistive element with a conductance value that is tunable. For a neural network model, the RPU cells 410 in the given RPU array comprise respective conductance values that are mapped to respective synaptic weight values of a weight matrix W for a given layer of the neural network model, which is stored in the array of RPU cells 410. In some embodiments, the resistive elements of the RPU cells 410 are implemented using resistive memory devices such as resistive switching devices (interfacial or filamentary switching devices), ReRAM, memristor devices, (phase-change material (PCM) device, etc.) and other types of devices which have a tunable conductance (or tunable resistance level) which can be programmatically adjusted within a range of a plurality of different conductance levels to tune the weight of the RPU cell 410. In some embodiments, the variable conductance elements of the RPU cells 410 can be implemented using ferroelectric devices such as ferroelectric field-effect transistor devices. Furthermore, in some embodiments, the RPU cells 410 can be implemented using an analog CMOS-based framework in which each RPU cell 410 comprises a capacitor and a read transistor. With the analog CMOS-based framework, the capacitor serves as a memory element of the RPU cell 410 and stores a weight value in the form a capacitor voltage, and the capacitor voltage is applied to a gate terminal of the read transistor to modulate a channel resistance of the read transistor based on the level of the capacitor voltage, wherein the channel resistance of the read transistor represents the conductance of the RPU cell and is correlated to a level of a read current that is generated based on the channel resistance.

While the row control lines RL and column control lines CL are each shown in FIG. 4 as a single line for ease of illustration, it is to be understood that each row and column control line can include two or more control lines connected to the RPU cells 410 in the respective rows and columns, depending on the implementation and the specific architecture of the RPU cells 410. For example, in some embodiments, each row control line RL can include a complementary pair of word lines for a given RPU cell 410. Moreover, each column control line CL may comprise multiple control lines including, e.g., one or more source lines (SL) and one or more bit lines (BL).

The peripheral circuitry 420 and 430 comprises various circuit blocks which are connected to the respective rows and columns in the 2D array of RPU cells 410, and which are configured to perform various analog, in-memory computation operations such as vector-matrix multiply functions, matrix-vector multiply functions, and outer product update operations, etc., to provide hardware accelerated computation operations as discussed herein. For example, in some embodiments, to support RPU cell read/sensing operations (e.g., read a weight value of a given RPU cell 410), the peripheral circuitry 420 and 430 comprises pulse-width modulation (PWM) circuitry and read pulse driver circuitry, which is configured to generate and apply PWM read pulses to the RPU cells 410 in response to digital input vector values (read input values) received during different operations. More specifically, in some embodiments, the peripheral circuitry 420 and 430 comprises digital-to-analog (D/A) converter circuitry that is configured to receive a digital input vector (to be applied to rows or columns) and convert the elements of the digital input vector into analog input vector values that are represented by input voltage voltages of varying pulse width. In some embodiments, a time-encoding scheme is used when input vectors are represented by fixed amplitude Vin=1 V pulses with a tunable duration (e.g., pulse duration is a multiple of 1 ns and is proportional to the value of the input vector). The input voltages applied to rows (or columns) generate output vector values which are represented by output currents, wherein the stored weights/values of the RPU cells 410 are essentially read out by measuring the output currents.

The peripheral circuitry 420 and 430 further comprises current integrator circuitry and analog-to-digital (A/D) converter circuitry to integrate read currents (TREAD) which are output and accumulated from the connected RPU cells 410 and convert the integrated currents into digital values (read output values) for subsequent computation. In particular, the currents generated by the RPU cells 410 are summed on the columns (or rows) and the summed current is integrated over a measurement time, $T_{MEAS}$, by current readout circuitry of the peripheral circuitry 420 and 430. The current readout circuitry comprises current integrators and analog-to-digital (A/D) converters. In some embodiments, each current integrator comprises an operational amplifier that integrates the current output from a given column (or row) (or differential currents from pairs of RPU cells implementing negative and positive weights) on a capacitor, and an analog-to-digital (A/D) converter converts the integrated current (e.g., an analog value) to a digital value.

The data I/O interfaces 425 and 435 are configured to interface with a digital processing core, wherein the digital processing core is configured to process input/outputs to the RPU system 400 (e.g., neural core) and route data between different RPU arrays. The data I/O interfaces 425 and 435 are configured to (i) receive external control signals and data from a digital processing core and provide the received control signals and data to the peripheral circuitry 420 and 430, and (ii) receive digital read output values from peripheral circuitry 420 and 430, and send the digital read output values to a digital processing core for processing. In some embodiments, the digital processing cores implement non-linear function circuitry which calculates activation functions (e.g., sigmoid neuron function, softmax, etc.) and other arithmetical operations on data that is to be provided to a next or previous layer of an artificial neural network.

The RPU system 400 of FIG. 4 can be configured to operate as an in-memory computing system or computational memory system in which an RPU array is utilized for a dual purpose of storing data and processing the data to perform some computational tasks. As noted above, neuromorphic computing systems and artificial neural network systems are types of in-memory computing systems in which artificial neurons are connected using artificial synaptic devices to provide synaptic weights which represent the strength of connection between two artificial neurons. The synaptic weights can be implemented using tunable resistive memory devices, wherein the variable conductance states are used to represent the synaptic weights and to perform computations (e.g., matrix-vector multiplication operations). The conductance states of the analog resistive memory devices are encoded or otherwise mapped to synaptic weights.

More specifically, in an exemplary embodiment, the array of RPU cells 410 of the RPU system 400 of FIG. 4 comprise artificial synaptic devices which connect artificial pre-synaptic neurons (e.g., artificial neurons of an input layer or hidden layer of the artificial neural network) and artificial post-synaptic neurons (e.g., artificial neuron of a hidden layer or output layer of the artificial neural network), wherein the artificial synaptic devices provide synaptic weights that represent connection strengths between the pre-synaptic and post-synaptic neurons. As shown in FIG. 4, the weights Wij (where i denotes the row index and j denotes the column index) are in the form of a matrix. In some embodiments, for convolutional neural networks, the weights Wij correspond to kernel parameters of a kernel matrix that is stored in the array of RPU cells 410. Further, in some embodiments, for convolutional neural networks, the weights Wij correspond to values of a Winograd transformation matrix that is stored in the array of RPU cells 410 to perform Winograd transformation operations in the analog domain.

When training an artificial neural network that is implemented (at least in part) using RPU devices such as shown in FIG. 1, as data moves forward through the network, vector matrix multiplications are performed, wherein the hidden neurons/nodes take the inputs, perform a non-linear transformation, and then send the results to the next weight matrix. This process continues until the data reaches the output neurons/nodes. The output neurons/nodes evaluate the classification error, and then propagate this classification error back in a manner similar to the forward pass, which results in a vector matrix multiplication being performed in the opposite direction. For each data set, when the forward pass and backward pass are completed, a weight update is performed. Essentially, each weight will be updated proportionally to the input to that weight as defined by the input neuron/node and the error computed by the neuron/node to which it is connected.

Figure 5:
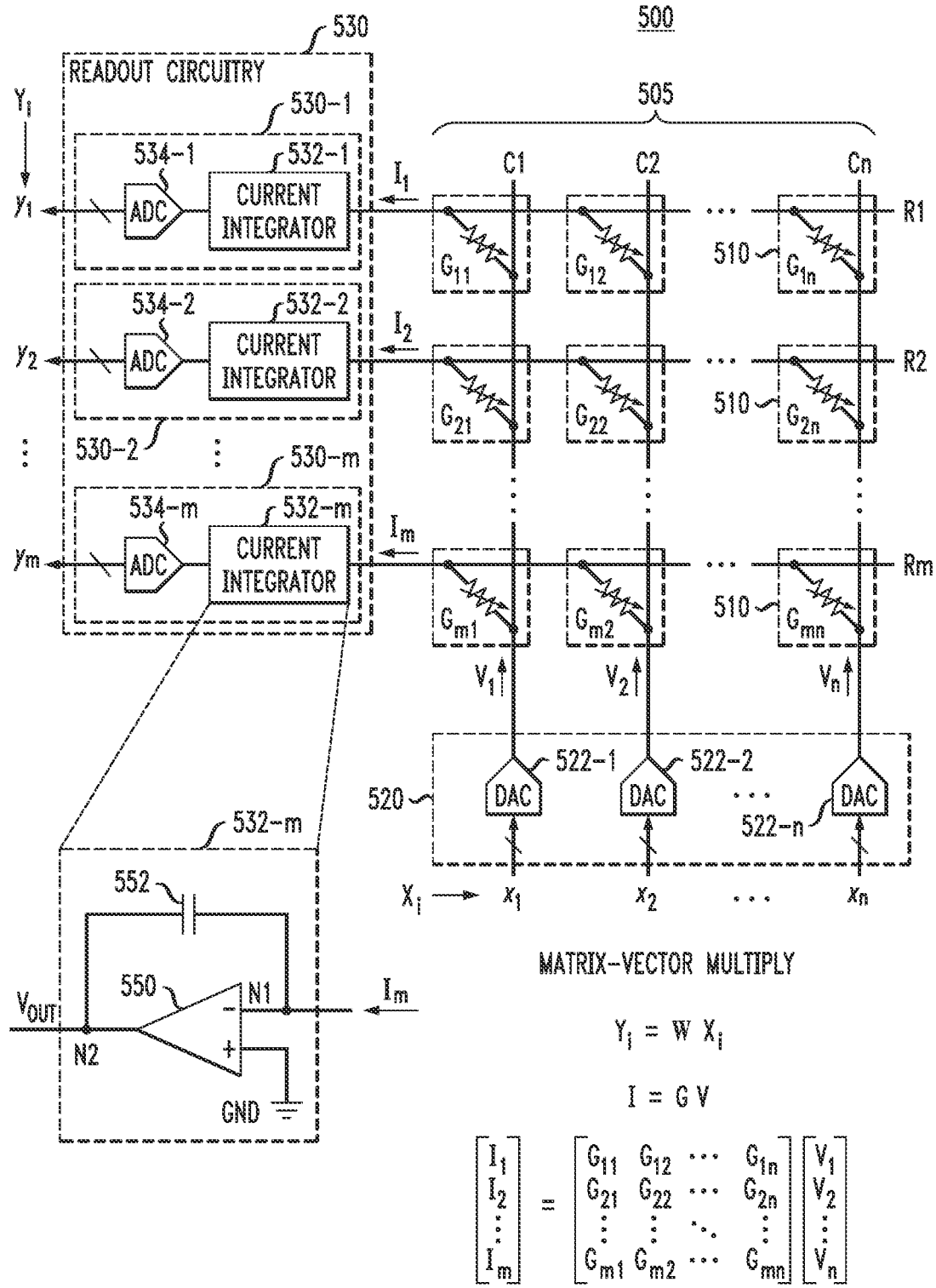
FIG. 5 schematically illustrates a method for configuring a resistive processing unit system to perform an analog matrix-vector multiplication operation on a weight matrix stored in resistive processing unit array, according to an exemplary embodiment of the disclosure.

FIG. 5 schematically illustrates a method for configuring an RPU system comprising an RPU array to perform an analog matrix-vector multiplication operation on a weight matrix stored in the RPU array, according to an exemplary embodiment of the disclosure. In particular, FIG. 5 schematically illustrates an RPU computing system 500 which comprises a crossbar array of RPU cells 505 (or RPU array 505), wherein each RPU cell 510 in the RPU array 505 comprises an analog non-volatile resistive element (represented as a variable resistor having a tunable conductance G) at the intersection of each row (R1, R2, . . . , Rm) and column (C1, C2, . . . , Cn). As depicted in FIG. 5, the RPU array 505 comprises a matrix of conductance values Gij which are mapped to matrix values of a given matrix (e.g., weight matrix W), which are encoded by the conductance values Gij (where i represents a row index and j denotes a column index) of the respective RPU cells 510. In an exemplary embodiment, the given matrix is stored in the RPU array 505 wherein the $i^{th}$ row of RPU cells 510 represents the $i^{th}$ row of the given matrix, and wherein the $j^{th}$ column of RPU cells 510 represents the $j^{th}$ column of the given matrix.

To perform a matrix-vector multiplication operation, multiplexer circuitry in the peripheral circuitry of the computing system 500 is configured to selectively connect column line driver circuitry 520 to the column lines C1, C2, . . . , Cn. The line driver circuitry 520 comprises plurality of digital-to-analog (DAC) circuit blocks 522-1, 522-2, . . . , 522-n (collectively DAC circuit blocks 522) which are connected to respective column lines C1, C2, . . . , Cn. In addition, multiplexer circuitry in the peripheral circuitry of the computing system 500 is configured to selectively connect readout circuitry 530 to the row lines R1, R2, . . . , Rm. The readout circuitry 530 comprises a plurality of readout circuit blocks 530-1, 530-2, . . . , 530-m, which are connected to respective row lines R1, R2, . . . , Rm. The readout circuit blocks 530-1, 530-2, . . . , 530-m comprise respective current integrator circuitry 532-1, 532-2, . . . , 532-m, and respective analog-to-digital (ADC) circuitry 534-1, 534-2, . . . , 534-m.

As further schematically shown in FIG. 5 for illustrative purposes, the current integrator circuitry 532-m comprises an operational transconductance amplifier (OTA) 550, and an integrating capacitor 552. The integrating capacitor 552 is connected in a negative feedback path between input and output nodes N1 and N2 of the operational amplifier 550. The operational amplifier 550 comprises a non-inverting input connected to ground (GND) voltage, an inverting input (denoted node N1) coupled to an output of the row line $R_m$, and an output (denoted node N2) connected to an input of the ADC circuit 534-m. The integrating capacitor 552 provides negative capacitive feedback to allow the operational amplifier 550 to convert an input current (e.g., aggregate row current $I_M$) to an output voltage $V_{OUT}$ on the output node N2. More specifically, the current integrator circuit 532-m performs an integration operation over an integration period ($T_{MEAS}$) to convert an input current at the input node N1 of the current integrator circuit 532-m to an analog voltage $V_{OUT}$ at the output node N2 of the current integrator circuit 532-m. At the end of an integration period, the ADC circuit 534-m latches in the output voltage $V_{OUT}$ generated at the output node N2, and quantizes the output voltage $V_{OUT}$ to generate a digital output signal. It is to be noted that each block of the current integrator circuitry shown in FIG. 5 implements the same framework shown for the current integrator circuitry 532-m.

In the exemplary configuration of FIG. 5, assuming a given matrix W is stored in the RPU array 505 such that the $i^{th}$ row of RPU cells represents the $i^{th}$ row of the stored matrix W, and the $j^{th}$ column of RPU cells represents the $j^{th}$ column of the stored matrix W, a matrix-vector multiplication process $Y_i=WX_i$, is performed by inputting a digital vector $X_i=[x_1, x_2, \ldots, x_n]$ to the column lines of the RPU array 505. The digital signals $x_1, x_2, \ldots, x_n$ are input to respective DAC circuit blocks 522-1, 522-2, . . . , 522-n which generate analog voltages $V_1, V_2, \ldots, V_n$ at the input to the respective column lines C1, C2, . . . , Cn, which are proportional to the input vector values $x_1, x_2, \ldots, x_n$, respectively. In some embodiments, the DAC circuit blocks 522-1, 522-2, . . . , 522-n each comprise pulse-width modulation circuitry and driver circuitry which is configured to generate pulse-width modulated (PWM) read pulses $V_1$, $V_2, \ldots, V_n$ that are applied to the respective column lines C1, C2, . . . , Cn.

More specifically, in some embodiments, as noted above, the DAC circuit blocks 522-1, 522-2, . . . , 522-n are configured to perform a digital-to-analog conversion process using a time-encoding scheme where the elements $x_1$, $x_2, \ldots, x_n$ of the input vector $X_i$ are represented by fixed amplitude pulses (e.g., V=1V) with a tunable duration, wherein the pulse duration is a multiple of a prespecified time period (e.g., 1 nanosecond) and is proportional to the value of the elements $x_1, x_2, \ldots, x_n$ of the input vector $X_i$. For example, a given digital input value of 0.5 can be represented by a voltage pulse of 4 ns, while a digital input value of 1 can be represented by a voltage pulse of 80 ns (e.g., a digital input value of 1 can be encoded to an analog voltage pulse with a pulse duration that is equal to the integration time $T_{meas}$).

To perform a matrix-vector multiplication, the analog input voltages $V_1, V_2, \ldots, V_n$ (e.g., pulses), are applied to the column lines C1, C2, ..., Cn, wherein each RPU cell 510 generates a corresponding read current $I_{READ}=V_j \times G_{ij}$ (based on Ohm's law), wherein $V_j$ denotes the analog input voltage applied to the given RPU cell 510 on the given column j and wherein Gij denotes the conductance value of the given RPU cell 510 (at the given row i and column j). As shown in FIG. 5, the read currents that are generated by the RPU cells 510 on each row i are summed together (based on Kirchhoff's current law) to generate respective currents $I_1$, $I_2, \ldots, I_m$ at the output of the respective rows R1, R2, ..., Rm. In this manner, the resulting row currents $I_1$, $I_2, \ldots, I_m$ represent the result of a matrix-vector multiplication operation that is performed, wherein the matrix W (which is represented by the conductance matrix G of conductance values Gij) is multiplied by the input analog voltage vector $[V_1, V_2, \ldots, V_n]$ to generate and output an analog current vector $[I_1, I_2, \ldots, I_m]$, as illustrated in FIG. 5. In particular, a given row current $I_i$ is computed as $I_i = \sum_{j=1}^{n} V_j G_{ij}$. For example, the row current $I_i$ for the first row R1 is determined as $I_i=(V_i G_{11}+V_2 G_{12}+, \ldots, +V_n G_{in})$.

The resulting aggregate read currents $I_1, I_2, \ldots, I_m$ at the output of the respective rows R1, R2, ..., Rm are input to respective readout circuit blocks 530-1, 530-2, ..., 530-m of the readout circuitry 530. The aggregate read currents $I_1$, $I_2, \ldots, I_m$ are integrated by the respective current integrator circuits 532-1, 532-2, ..., 532-m to generate respective output voltages, which are quantized by the respective ADC circuits 534-1, 534-2, ..., 534-m to generate a resulting output vector $Y_i=[y_1, y_2, \ldots, y_m]$, which represents the result of the matrix-vector multiplication operation.

The exemplary embodiment of FIG. 5 schematically illustrates a process for performing a matrix-vector multiplication operation $Y_i = W X_i$ wherein (i) the matrix W is stored in the RPU array 505 such that the $i^{th}$ row of RPU cells represents the $i^{th}$ row of the matrix W, and the $j^{th}$ column of RPU cells represents the $j^{th}$ column of the matrix W, (ii) the input vector $X_i$ is input to the columns, and (iii) the resulting output vector $Y_i$ is generated at the output of the rows. In other embodiments, the same matrix-vector multiplication operation can be performed by (i) storing a transpose matrix $W^T$ of the matrix W in the RPU array 505 such that the $i^{th}$ row of the matrix W is stored in the RPU array 505 as the $j^{th}$ column of the transpose matrix $W^T$, (ii) applying the input vector $X_i$ to the rows, and (iii) reading the resulting output vector $Y_i$ at the output of the columns.

Figure 6:
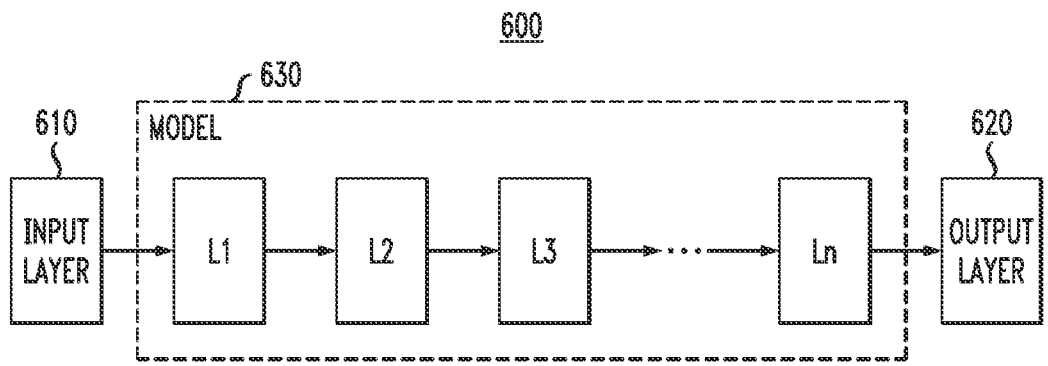
FIG. 6 schematically illustrates a framework of a convolutional neural network model which can be trained using an analog resistive processing unit system, according to an exemplary embodiment of the disclosure.

FIG. 6 schematically illustrates a framework of a convolutional neural network 600 which can be trained using an analog resistive processing unit system, according to an exemplary embodiment of the disclosure. The convolutional neural network 600 comprises a plurality of layers including an input layer 610, an output layer 620, and a plurality of hidden layers 630 (e.g., L1, L2, L3, ..., Ln) between the input and output layers 610 and 620. The input layer 610 comprises artificial input neurons, which receive input data for further processing by subsequent hidden layers 630 of artificial neurons. For a convolutional neural network, the hidden layers 630 comprise layers such as convolutional layers, pooling layers, and a fully connected layer which decides a final classification of an input data (e.g., image).

More specifically, a convolutional layer applies a "convolution operation" to an input dataset and passes the processing results to the next layer of the convolutional neural network. The convolutional layers are the layers where filters (e.g., kernels) are applied to original input data, or to other feature maps in a deep convolutional neural network. A convolutional layer applies a set of filters (kernels) to input data or feature maps to extract features. For example, a convolutional layer receives as input a 3D volume (e.g., 3D volume of input data (e.g., image data), or a 3D volume comprising a set of feature maps generated by a previous layer of the convolutional neural network), and generates a 3D output volume which comprises a plurality of 2D feature maps, which include one 2D feature map per kernel. The number of kernels and the dimensions of the kernels for a given convolutional layer will vary depending on the target application. The kernels comprise parameters (e.g., kernel weight values) that are learned using a training process for training the convolutional neural network 600. The convolution layer applies an activation function (e.g., ReLU (rectified non-linear unit)) on the values of 2D feature maps generated by the convolutional layer.

Furthermore, pooling layers are similar to convolutional layers in that the pooling layers apply filters to a 3D volume of feature maps generated by another layer. However, the pooling layers perform specific functions such as max pooling, which takes the maximum value in a certain filter region, or average pooling, which takes the average value in a filter region. The pooling layers are utilized to reduce a dimensionality of the convolutional neural network. In a convolutional neural network, a fully connected layer can be disposed before the classification output layer 620 to flatten the results before classification. The fully connected layer aggregates information from the final feature maps to generate a final classification.

Figure 7:
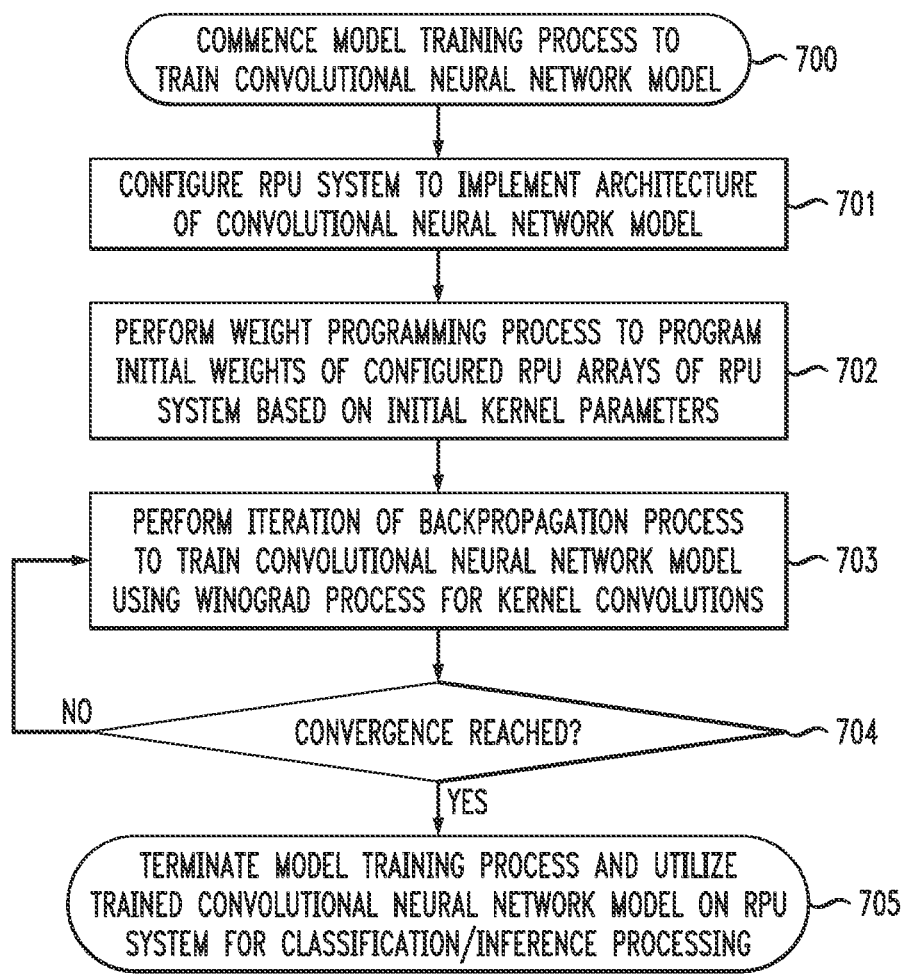
FIG. 7 illustrates a flow diagram of a method for configuring and utilizing a resistive processing unit system to train a convolutional neural network model, according to an exemplary embodiment of the disclosure.

FIG. 7 illustrates a flow diagram of a method for configuring and utilizing a resistive processing unit system to train a convolutional neural network model, according to an exemplary embodiment of the disclosure. In some embodiments, the process flow of FIG. 7 illustrates exemplary modes of operation of the digital processing system 110 of FIG. 1, which commences a model training process to train a convolutional neural network using the processes 130 and 132 (block 700). As an initial step, the hardware configuration process 132 (FIG. 1) is performed to configure an analog RPU system to implement an architecture of a convolutional neural network model that is to be trained using RPU hardware (block 701). In some embodiments, the hardware configuration process involves configuring the neural cores (e.g., RPU chips) of an RPU-based neuromorphic computing system to implement the convolutional neural network architecture. In some embodiments, the digital signal processing system 110 communicates with a programming interface of the neuromorphic computing system 120 to configure one or more artificial neurons and a routing system of the neuromorphic computing system 120 to implement the convolutional neural network model in RPU hardware. Depending on the number and/or sizes of the layers of the convolutional neural network, the number and sizes of the kernel filters, the RPU system hardware can be configured using one or more RPU chips (FIG. 2) or one or more RPU compute nodes (FIG. 3).

For example, multiple RPU tiles of a given RPU chip can be configured together through physical connections and under the control of firmware, to implement the trained artificial neural network wherein on-chip network routers perform communications among the individual RPU tiles. For relatively large artificial neural networks (e.g., 10 or more layers), an RPU compute node (FIG. 3) with multiple RPU chips can be configured to implement the convolutional neural network in RPU hardware. The number of RPU arrays that are allocated and interconnected to configure the artificial synapses of the convolutional neural network will vary depending on the number and sizes of the kernel matrices that are needed for implementing the layers of the convolutional neural network model. Different kernel matrices can be implemented on the same RPU array or on different RPU arrays.

Once the RPU system is configured to implement the architecture of the convolutional neural network model, the configuration process continues by performing a weight programming process to program the initial values of the kernel matrices of the convolutional layers, and the predefined values of the Winograd transformation matrices, in the RPU arrays of the RPU system (block 702). More specifically, the weight programming process involves programming the RPU arrays with conductance values of the RPU cells, which correspond to the initial parameter values of the kernels, and to the predefined parameter values of the Winograd transformation matrices.

Once the RPU system is configured, the RPU system can be utilized to perform the model training process using a backpropagation process to train the convolutional neural network on the analog RPU system, and using the RPU system to perform analog matrix-matrix and matrix-vector multiplications in the analog domain to perform Winograd kernel convolution operations (block 703). In some embodiments, the training process is performed using multiple iterations of the backpropagation process in conjunction with an SGD process in which error gradients with respect to the model parameters (e.g., kernel parameters) of the convolutional neural network are calculated using multiple iterations of a backpropagation process.

A backpropagation comprises a sequence of three cycles including (i) a forward process, (ii) a backward process, and (iii) a weight update process, wherein the backpropagation process is repeated for many iterations until a convergence criterion is met. For each iteration backpropagation process, a mini-batch of training data is input to the convolutional neural network model, and a forward propagation process is performed to process the mini-batch of data, layer by layer, of the convolutional neural network model. As data moves forward through the network, matrix-vector multiplication computations are performed, wherein hidden layers (e.g., convolutional layers, pooling layers, etc.) of the convolutional neural network receive the data inputs, perform a non-linear transformation, and then send the results to a next layer. This process continues until the data reaches the output layer of neurons.

The output layer of neurons evaluates a classification error, and then propagates the classification error back through the neural network in a manner similar to the forward pass, which results in a matrix-vector multiplication computations being performed in the opposite direction. In particular, once the information reaches the final output layer of the deep learning model, an error signal is calculated and back propagated through the layers of the deep learning model using a backward process which involves minimizing an objective function by calculating error gradients with respect to model parameters (e.g., weights) and the input data. The error backpropagation process is configured to compute gradients of the loss with respect to the deep learning model parameters. In this regard, with backpropagation, the error between the actual response and the predicted response is minimized. For each mini-batch of data, when the forward pass and backward pass are completed, a weight update is performed. Essentially, each weight will be updated proportionally to the input to that weight as defined by the input neuron and the error computed by the neuron to which it is connected.

The iterations of the backpropagation training process continue until a convergence criterion is reached (affirmative result in block 704), in which case the model training process terminates, and the trained convolution neural network can be utilized on the RPU system to perform hardware-accelerated classification or inference processing in the analog domain (block 705). The inference/classification process involves processing input data in a forward pass operation through the layers of the trained convolutional neural network, similar to the forward pass operations of the backpropagation process used for training the convolutional neural network.

An exemplary model training process will be described in further detail below in conjunction with FIGS. 8A, 8B, 8C, 8D, 8E, 8F, 8G, 8H, and 8I, which schematically illustrate a method for training a convolutional neural network model on an analog resistive processing unit system using a Winograd filtering function for convolution operations, and a backpropagation training process, according to an exemplary embodiment of the disclosure. As noted above, a Winograd filtering process is a fast algorithm which is used with convolutional neural networks to decrease the latency in performing convolution operations by reducing the number of multiplication operations that are needed for the convolution operations. The Winograd filtering process utilizes predefined transformation matrices to transform input data and kernels from a spatial domain to a transformed domain, wherein the convolution operations are applied in the transformed domain, and the convolution output is transformed back to the spatial domain using an inverse transformation function.

More specifically, as is known in the art, the Winograd convolution is based on a minimal 1D filtering algorithm (denoted F(m,r)) for computing m outputs with an r-tap FIR filter, which requires $\mu(F(m,r))=m+r-1$ multiplications. Furthermore, in general, a minimal 2D filtering algorithm (denoted F(m×n, r×s)) can be formed by nesting two minimal 1D algorithms F(m, r) and F(n, s), for computing m×n outputs with an r×s filter, which requires $\mu(F(m\times n, r\times s))=(m+r-1)(n+s-1)$ multiplications. This nesting technique is generalized for non-square filters and outputs, F(m×n, r×s).

Furthermore, for square filters and outputs, the minimal 1D filtering algorithm F(m, r) can be nested with itself to obtain the minimal 2D filtering algorithm F(m×m, r×r). In this instance, a fast 2D filtering algorithm F(m×m, r×r) for square filters and outputs can be written in matrix form as follows: $Y=A^T[[GgG^T]\odot[B^TdB]]A$, where Y denotes an m×m convolution output result of a Winograd convolution computation, where $\odot$ denotes an element-wise multiplication, where g denotes an r×r filter, where d denotes a (m+r−1)×(m+r−1) image tile, and where A, B, and G denote predefined transformation matrices, which result from the specifics of the Winograd algorithm, the details of which are well known to those of ordinary skill in the art.

In accordance with exemplary embodiments described herein, a Winograd function is generally denoted as F(I×I, k×k), where I denotes a parameter that is selected to obtain a convolution output of size I×I for convolution operations performed using kernels (filters) of size k×k. For example, in some embodiments, I=2 and k=3. In particular, a Winograd algorithm (for 2D) for F(I×I, k×k) is utilized to compute convolutional neural network layers with kernels of size k×k, wherein each image channel is divided into tiles of size (I+k−1)×(I+k−1), with k−1 elements of overlap between neighboring tiles, yielding $$P = \left(\frac{H}{I}\right)\left(\frac{W}{I}\right)$$

tiles per channel, C, wherein H and W denote the height and width in terms of number of pixels of a given 2D data block or feature map, and C denotes the depth (e.g., color channels) of the data block or feature map, forming a 3D volume. The Winograd function F(I×I, k×k) is computed for each tile and kernel combination in each channel, and the results are summed over all the channels.

More specifically, for the minimal 2D algorithm (I×I, k×k), the Winograd computation comprises the following Winograd transformation operations:

Input Transformation→$B_{(I+k-1)\times(I+k-1)}I_{(I+k-1)\times(I+k-1)}$
$[B_{(I+k-1)\times(I+k-1)}]^T$    (Eqn. 1)

Kernel Transformation→$G_{(I+k-1)\times k}K_{k\times k}[G_{(I+k-1)\times k}]^T$    (Eqn. 2)

Output Transformation→$A_{I\times(I+k-1)}O_{t(I+k-1)\times(I+k-1)}$
$[A_{I\times(I+k-1)}]^T$.    (Eqn. 3)

For the input transformation, the matrix I denotes an input data tile (or slice), and the B and $B^T$ matrices denote a predefined Winograd transformation matrix B (and its transpose) which are utilized to transform the input data tile I into the Winograd transformation domain. The input transformation process results in a transformed input matrix $I_t$ of size (I+k−1)×(I+k−1).

For the kernel transformation, the matrix K denotes a convolutional filter (i.e., kernel), and the G and $G^T$ matrices denote a predefined Winograd transformation matrix G (and its transpose), which are utilized to transform the kernel K into the Winograd transformation domain. The kernel transformation process results in a transformed kernel matrix $K_t$ of size (I+k−1)×(I+k−1). In this regard, the transformed kernel matrix $K_t$ and the transformed input matrix $I_t$ have the same dimensions.

For the output transform, the matrix $O_t$ denotes a transformed output which is computed as an element-wise multiplication of $K_t$ and $I_t$. Further, the A and $A^T$ matrices denote a predefined Winograd transformation matrix A (and its transpose) which are utilized to perform an inverse transformation process to compute an output matrix O (in the spatial domain) from the transformed output $O_t$ (in the Winograd transformed domain).

Figure 8A:
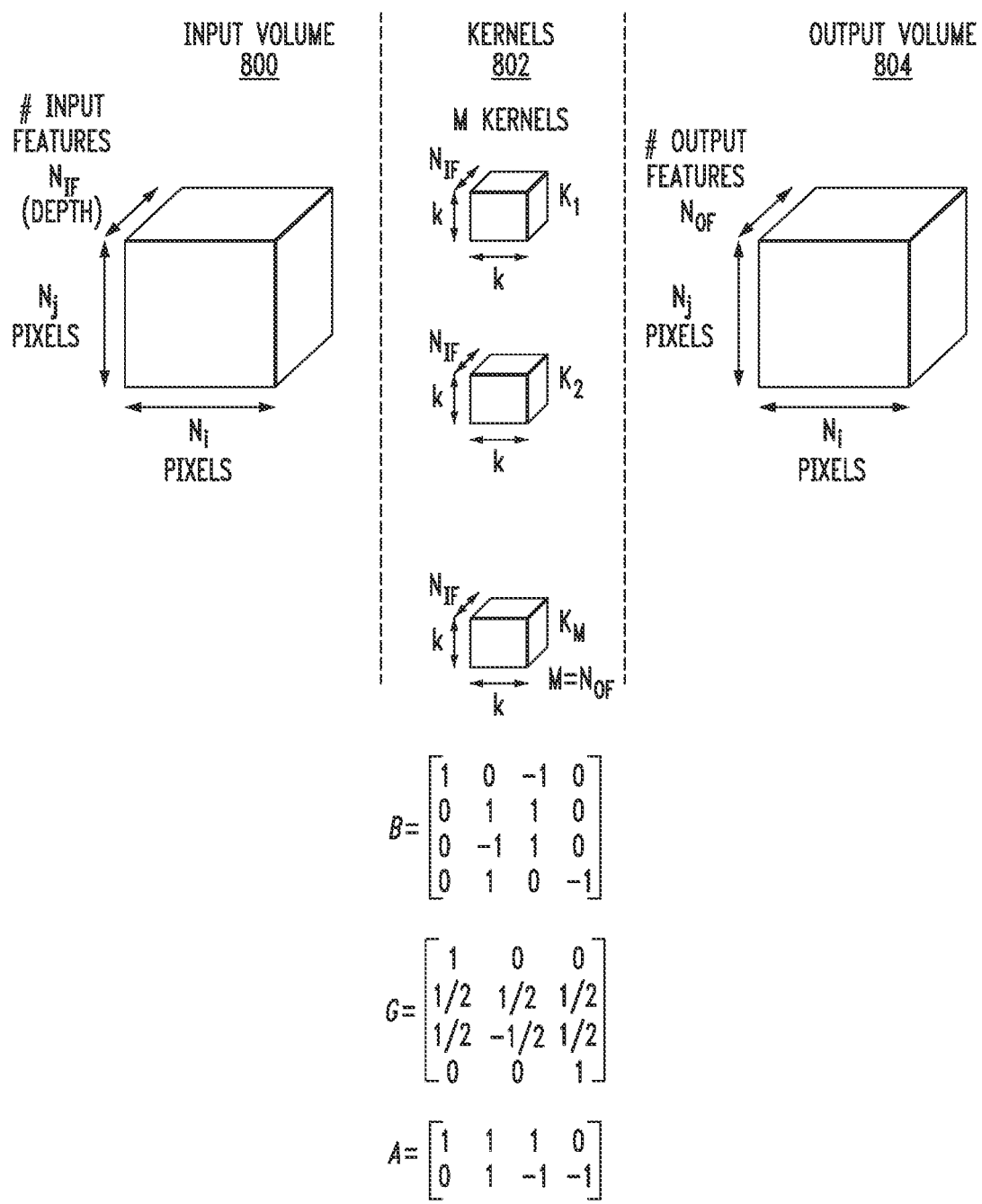

FIG. 8A schematically illustrates an input data volume, a plurality of convolutional kernels of a convolution layer, and transformation matrices which can be utilized to transform the input data volume and convolutional kernels to enable training of a convolutional neural network on an analog resistive processing unit system using a Winograd filtering function, according to an exemplary embodiment of the disclosure. More specifically, FIG. 8A schematically illustrates an input data volume 800, a plurality of kernels 802 (e.g., $K_1, \ldots, K_M$), and an output volume 804, which are depicted in a non-transformed state. The kernels 802 (e.g., $K_1, \ldots, K_M$) represent the set of convolutional filters for a given convolutional layer of a convolutional neural network that is being trained. The input data volume 800 can be an image or an output of a previous layer of the convolutional neural network, wherein the input data volume 800 has dimensions of $N_i \times N_j \times N_{IF}$, where $N_i$ denotes a width (W) of the input volume 800, where $N_j$ denotes a height (H) of the input volume 800, and where $N_{IF}$ denotes a number of input features or channels (e.g., depth D) of the input volume 800. The different input features correspond to different components of the input data volume 800 (e.g., red, green and blue (RGB) components of a colored image).

By way of example, the input volume 800 may be an image comprising a matrix of 256×256 (Width×Height) pixels, wherein each pixel comprises a pixel value within a range of pixels values that are encoded based on the bit size of the pixel (e.g., an 8-bit pixel can have a value in a range of [0, 255]). With a colored image (e.g., RGB-based images), the addition of separate color channels (e.g., $N_{IF}=3$ color channels for RGB images) introduces an additional depth field to the input volume 800. In this regard, the input data volume 800 may be a 3D data structure with a dimension of 256×256×3.

The convolution kernels 802 comprise filters that are applied to the input volume 800. In the exemplary embodiment shown in FIG. 8A, each kernel $K_1$-$K_M$ comprises a 3D volume comprising a 2D matrix of k×k kernel values and a depth of $N_{IF}$ channels, one kernel channel for each of the different channels (e.g., color planes) of the input volume 800. Each kernel $K_1$-$K_M$ is convolved with the input volume 800 to obtain the output volume 804. The output volume 804 comprises a number of output features, denoted $N_{OF}$, where $N_{OF}$ is equal to the number of kernels (i.e., $N_{OF}=M$). Each of the $N_{OF}$ output features comprises a feature map which corresponds to given one of the M kernels, wherein each feature map indicates regions where features specific to the given kernel have been detected in the input volume. While the convolution operation is separately performed between each corresponding channel of the input volume 800 and a given kernel (e.g., three color planes RGB), the separate convolution results for each channel (or plane) are added to produce a single output value in the feature map generated as a result of the given kernel. During the training process, the values of each kernel matrix will change with each learning iteration over a training set, indicating that the convolutional neural network is learning to identify which regions are of significance for extracting features from the input data.

The training process (e.g., backpropagation training process) is performed in the Winograd domain based on the exemplary 2D Winograd function F(I×I, k×k), wherein each input volume (e.g., input volume 800) of each mini-batch of data is transformed into the Winograd domain using the input transformation process (Eqn. 1), and wherein each kernel volume (e.g., kernels $K_1$-$K_M$ 802) is transformed into the Winograd domain using the kernel transformation process (Eqn. 2). In an exemplary embodiment where I=2 and k=3, FIG. 8A depicts predefined Winograd transformation matrices B, G, and A, which are used for the input, kernel, and output transformation computations (Eqns. 1, 2 and 3). The parameters I and k can have other values depending on the application, wherein the dimensions and values of the predefined Winograd transformation matrices B, G, and A will vary depending on the values of I and k, as is understood by those of ordinary skill in the art. For each iteration of the backpropagation process, a forward pass operation involves performing Winograd convolutions in the analog domain using an analog RPU system.

FIG. 8B schematically illustrates a process for applying a transformation function to an input data volume to generate a transformed input volume for training a convolutional neural network on an analog resistive processing unit system using a Winograd filtering function, according to an exemplary embodiment of the disclosure. In particular, FIG. 8B schematically illustrates an input transformation process 810 which is performed using the input transformation of Eqn. 1. As shown in FIG. 8B, a 2D input data tile 812 of dimension $N_i \times N_j$ (matrix I) is divided into a plurality of tiles 814-1, 814-2, ..., 814-S, each tile of size (I+k−1)×(I+k−1) (e.g., 4×4), wherein the tiles 814-1, 814-2, ..., 814-S overlap with a stride of I (e.g., stride of 2). Each tile 814-1, 814-2, ..., 814-S essentially corresponds to a given I×I portion 812-1, 812-2, ..., 812-S (e.g., 2×2 portion) of the input data tile 812. The number of tiles is $$S = \left(\frac{N_i}{I}\right) \times \left(\frac{N_j}{I}\right) = \frac{N_i \times N_j}{I^2}.$$

The input transformation process 810 results in a set of 2D transformed input blocks 816 for one input feature (e.g., one color channel). More specifically, as shown in FIG. 8B, the set of 2D transformed input blocks 816 comprises a plurality (S) of transformed blocks 816-1, 816-2, ..., 816-S which correspond to the input transformation (via Eqn. 1) of the respective input tiles 814-1, 814-2, ..., 814-S. The transformed blocks 816-1, 816-2, ..., 816-S each comprise a 2D matrix of dimension (I+k−1)×(I+k−1) (e.g., 4×4), which is the same dimension as the input tiles 814-1, 814-2, ..., 814-S.

As further schematically illustrated in FIG. 8B, the 2D transformed blocks 816-1, 816-2, ..., 816-S are reshaped (e.g., collapsed) into respective row vectors 818-1, 818-2, ..., 818-S, wherein each row vector has a dimension of 1×((I+k−1)×(I+k−1)). The row vectors 818-1, 818-2, ..., 818-S are stacked to form a 2D matrix 818 with dimensions of:

$$((I+k-1) \times (I+k-1)) \times \frac{N_i \times N_j}{I^2},$$

where $$S = \frac{N_i \times N_j}{I^2}.$$

The input transformation is repeated for the remaining input features (e.g., color channel) to generate a 3D transformed input volume 819 with dimensions of:

$$((I+k-1) \times (I+k-1)) \times \frac{N_i \times N_j}{I^2} \times N_{IF}.$$

The 3D transformed input volume 819 comprises a stack of 2D matrices 819-1, 819-2, ..., 819-S. It is to be noted that in some embodiments, the input transformation process of FIG. 8B is performed in the analog domain using an RPU system to perform the matrix-matrix multiplication operations of Eqn. 1 using one or more RPU crossbar arrays programmed with the predefined Winograd transformation matrices B and $B^T$, the details of which will be explained in further detail below in conjunction with FIG. 9.

FIG. 8C schematically illustrates a process for applying a transformation function to a set of convolutional kernels of a convolutional layer to generate a set of transformed kernels for training a convolutional neural network on an analog resistive processing unit system using a Winograd filtering function, according to an exemplary embodiment of the disclosure. In particular, FIG. 8C schematically illustrates a kernel transformation process 820 which is performed using the kernel transformation of Eqn. 2 to transform a plurality of 3D kernel volumes 820-1, 820-2, ..., 820-M (e.g., kernels $K_1, ..., K_M$) into a set of transformed kernel volumes 822 which comprises respective 3D transformed kernel volumes 822-1, 822-2, ..., 822-M. It is to be noted that while each 3D kernel volume 820-1, 820-2, ..., 820-M comprises dimensions of k×k×$N_{IF}$ (e.g., 3×3×3), each respective 3D transformed kernel volume 822-1, 822-2, ..., 822-M comprises dimensions of (I+k−1)×(I+k−1)×$N_{IF}$ (e.g., 4×4×3).

As further schematically illustrated in FIG. 8C, a first reshaping process is performed to reshape (e.g., collapse) each 3D transformed kernel volume 822-1, 822-2, ..., 822-M into a respective 2D transformed kernel matrix 824-1, 824-2, ..., 824-M. Each 2D transformed kernel matrix 824-1, 824-2, ..., 824-M has dimensions of [(I+k−1)×(I+k−1)]×$N_{IF}$. With the first reshaping process, each 2D transformed kernel volume for each channel $N_{IF}$ of a given kernel volume is collapsed to a row vector, and the row vectors are combined to form the 3D transformed kernel volume for the given kernel volume. As shown in FIG. 8C, the 2D transformed kernel matrices 824-1, 824-2, ..., 824-M are stacked to form a 3D transformed volume 824 having dimensions of: ((I+k−1)×(I+k−1))×M×$N_{IF}$, where M=$N_{OF}$ denotes the number of kernels.

Next, as schematically shown in FIG. 8C, a second reshaping process (e.g., kernel rearranging process) is performed to reshape the 3D transformed volume 824 into a vertically sliced volume 826 which comprises a plurality (n) of vertical 2D kernel slices 826-1, 826-2, ..., 826-n, where n=(I+k−1)×(I+k−1). For example, in an exemplary embodiment where I=2 and k=3, the number of kernel slices n=4×4=16. As shown in FIG. 8C, each 2D kernel slice 826-1, 826-2, ..., 826-n has dimensions of M×$N_{IF}$, where M=$N_{OF}$. In some embodiments, the kernel transformation process of FIG. 8C is performed in the digital domain, as the kernel transformation process of Eqn. 2 is performed one-time for a given convolution layer which comprises the set of kernels 3D kernel volumes 820-1, 820-2, ..., 820-M (e.g., kernels $K_1, ..., K_M$). In this regard, the performance penalty for the kernel transformation is essentially negligible, as the kernel transformation is computed one time and then applied to all the Winograd convolution computations for all input data (e.g., images in a given mini-batch). In some embodiments, the matrix-matrix multiplication operations for the kernel transformation process of Eqn. 2 can be implemented in the analog domain using one or more RPU crossbar arrays programmed with the predefined Winograd transformation matrices G and $G^T$.

Figure 8D:
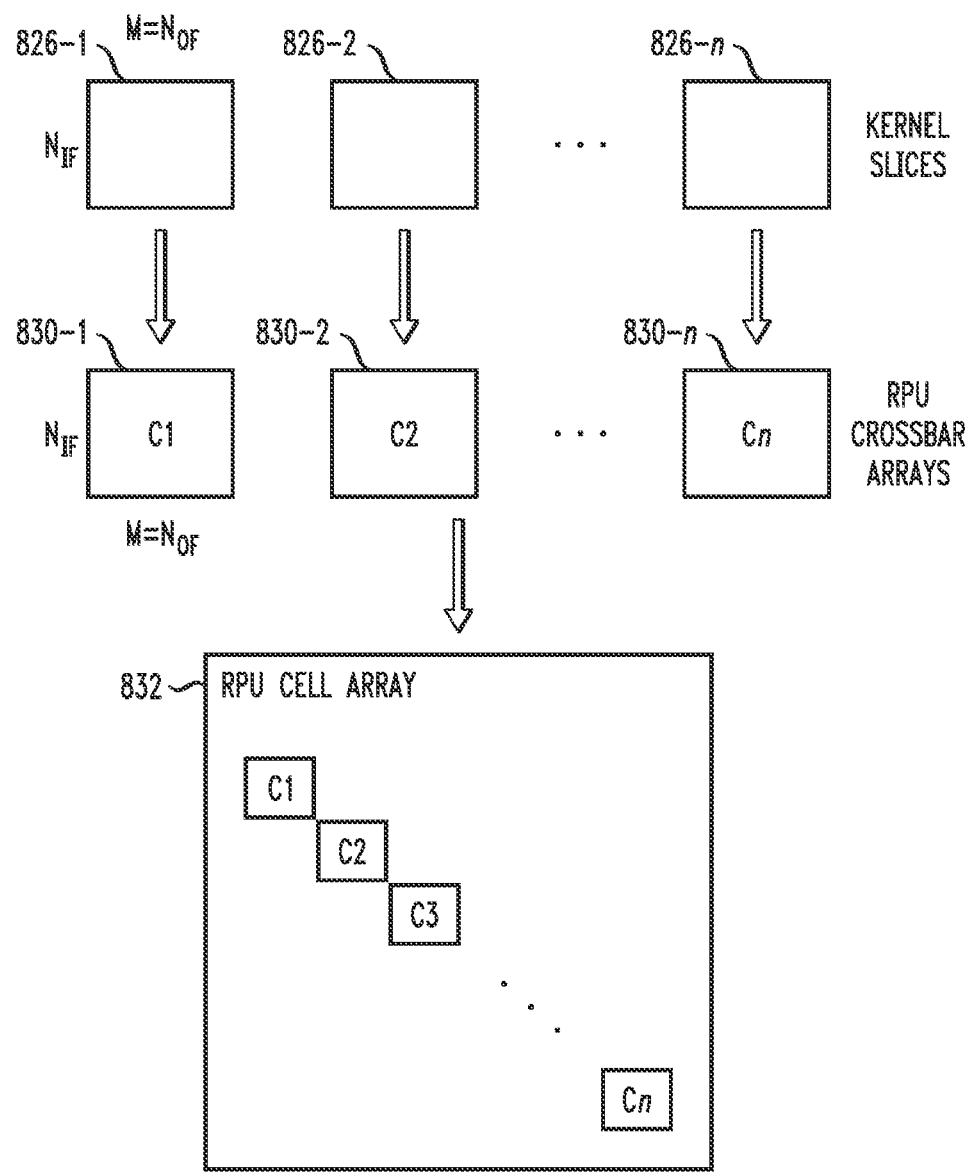

Next, FIG. 8D schematically illustrates a process for mapping a set of transformed kernels to corresponding resistive processing unit crossbar arrays for training a convolutional neural network on an analog resistive processing unit system using a Winograd filtering function, according to an exemplary embodiment of the disclosure. More specifically, FIG. 8D schematically illustrates a process for mapping the 2D kernel slices 826-1, 826-2, ..., 826-n to respective RPU crossbar arrays 830-1, 830-2, ..., 830-n (or C1, C2, ..., Cn), according to an exemplary embodiment of the disclosure. For example, in an exemplary embodiment where n=16, there will be sixteen (16) kernel slices which are mapped to sixteen (16) separate RPU crossbar arrays (e.g., C1, C2, C3, ..., C16).

In some embodiments, such as schematically illustrated in FIG. 8D, every RPU crossbar array (e.g., C1, C2, C3, ..., Cn) can implemented on a single RPU cell array 832 (or RPU tile). In this instance, each RPU crossbar array (e.g., C1, C2, C3, ..., Cn) will be disposed offset from each other such that each RPU crossbar array (e.g., C1, C2, C3, ..., Cn) will have separate, dedicated I/Os for pipeline parallel access to separate RPU crossbar arrays 830-1, 830-2, ..., 830-n (or C1, C2, ..., Cn) that are mapped to the respective 2D kernel slices 826-1, 826-2, ..., 826-n. In some embodiments, the 2D kernel slices 826-1, 826-2, ..., 826-n may be mapped to respective RPU crossbar arrays 830-1, 830-2, ..., 830-n, which each reside on different physical RPU tiles. In other embodiments, subsets of two or more RPU crossbar arrays 830-1, 830-2, ..., 830-n can be implemented on different physical RPU tiles. In this regard, it is to be understood that the particular mapping of the 2D kernel slices 826-1, 826-2, ..., 826-n to their respective RPU crossbar arrays 830-1, 830-2, ..., 830-n (or C1, C2, ..., Cn) will vary depending on, e.g., the size (dimensions) of the kernel slices, the number of kernel slices, the array dimensions of the available RPU tiles, etc. In all instances, each transformed kernel matrix 826-1, 826-2, ..., 826-n is stored in a separately addressable region of an RPU crossbar array.

Next, FIG. 8E schematically illustrates a process for performing convolution operations using a Winograd filtering function in a forward pass cycle of a backpropagation training process by performing matrix-vector multiplication operations on the resistive processing unit crossbar arrays to apply the set of transformed kernels to the transformed input volume and generate a transformed output volume, according to an exemplary embodiment of the disclosure. More specifically, FIG. 8E schematically illustrates a process for performing Winograd convolution operations to compute a transformed output $O_t$ in an analog domain using an RPU system, according to an exemplary embodiment of the disclosure. As schematically illustrated in FIG. 8E, the Winograd convolution operations are performed using (i) the 3D transformed input volume 819 (FIG. 8B) which comprises the stack of 2D matrices 819-1, 819-2, ..., 819-S, and (ii) the RPU crossbar arrays 830-1, 830-2, ..., 830-n (C1, C2, ..., Cn) encoded with the parameters of the respective 2D kernel slices 826-1, 826-2, ..., 826-n (FIG. 8D). As an initial step, each layer (e.g., 2D matrix 819-1, 819-2, ..., 819-S) of the transformed input volume 819 is divided into a plurality (n) of input vectors X1, X2, X3, X4, ..., Xn.

A convolution operation 840 is performed, starting at time T1, by inputting (in parallel) the input vectors X1, X2, X3, X4, ..., Xn of the transformed input layer 819-1 to the respective RPU crossbar arrays 830-1, 830-2, ..., 830-n (C1, C2, ..., Cn), and generating respective output vectors Y1, Y2, Y3, Y4, ..., Yn (collectively, output vectors 842-1). The output vectors 842-1 (Y1, Y2, Y3, Y4, ..., Yn) are generated as a result of the matrix-vector multiplication operations that are performed by the respective RPU crossbar arrays 830-1, 830-2, ..., 830-n (C1, C2, ..., Cn) multiplying the 2D kernel matrix slices 826-1, 826-2, ..., 826-n (encoded in the respective RPU crossbar arrays C1, C2, ..., Cn) with the respective input vectors X1, X2, X3, X4, ..., Xn of the transformed input layer 819-1. The output vectors 842-1 are concatenated to generate a first 2D layer 844-1 of a transformed output 844.

Next, starting at time T2, the input vectors X1, X2, X3, X4, ..., Xn of the transformed input layer 819-2 are input (in parallel) to the respective RPU crossbar arrays 830-1, 830-2, ..., 830-n (C1, C2, ..., Cn), to generate respective output vectors Y1, Y2, Y3, Y4, ..., Yn (collectively, output vectors 842-2). The output vectors 842-2 are combined to generate a second 2D layer 844-2 of the transformed output volume 844. This parallel pipelined convolution process is repeated for the input vectors X1, X2, X3, X4, ..., Xn of the remaining transformed input layers up to the last transformed input layer 819-S. The output vectors Y1, Y2, Y3, Y4, ..., Yn for the final transformed input layer 819-S are generated as a result of the matrix-vector multiplication operations that are performed by the respective RPU crossbar arrays 830-1, 830-2, ..., 830-n (C1, C2, ..., Cn) multiplying the 2D kernel matrices slices 826-1, 826-2, ..., 826-n (encoded in the respective RPU crossbar arrays C1, C2, ..., Cn) with the respective input vectors X1, X2, X3, X4, ..., Xn of the transformed input layer 819-S, wherein the output vectors are concatenated to generate a final 2D layer 844-S of the transformed output volume 844.

As shown in FIG. 8E, the transformed output volume 844 has dimensions of $n \times S \times N_{OF}$, where (as noted above) $n = (I+k-1) \times (I+k-1)$, $$S = \left(\frac{N_i}{I}\right) \times \left(\frac{N_j}{I}\right) = \frac{N_i \times N_j}{I^2},$$

and $N_{OF} = M$. In this regard, it is to be appreciated that both (i) the number of computations needed to compute the transformed output and (i) the weight sharing factor, are reduced by a factor of $I^2$.

Figure 8F:
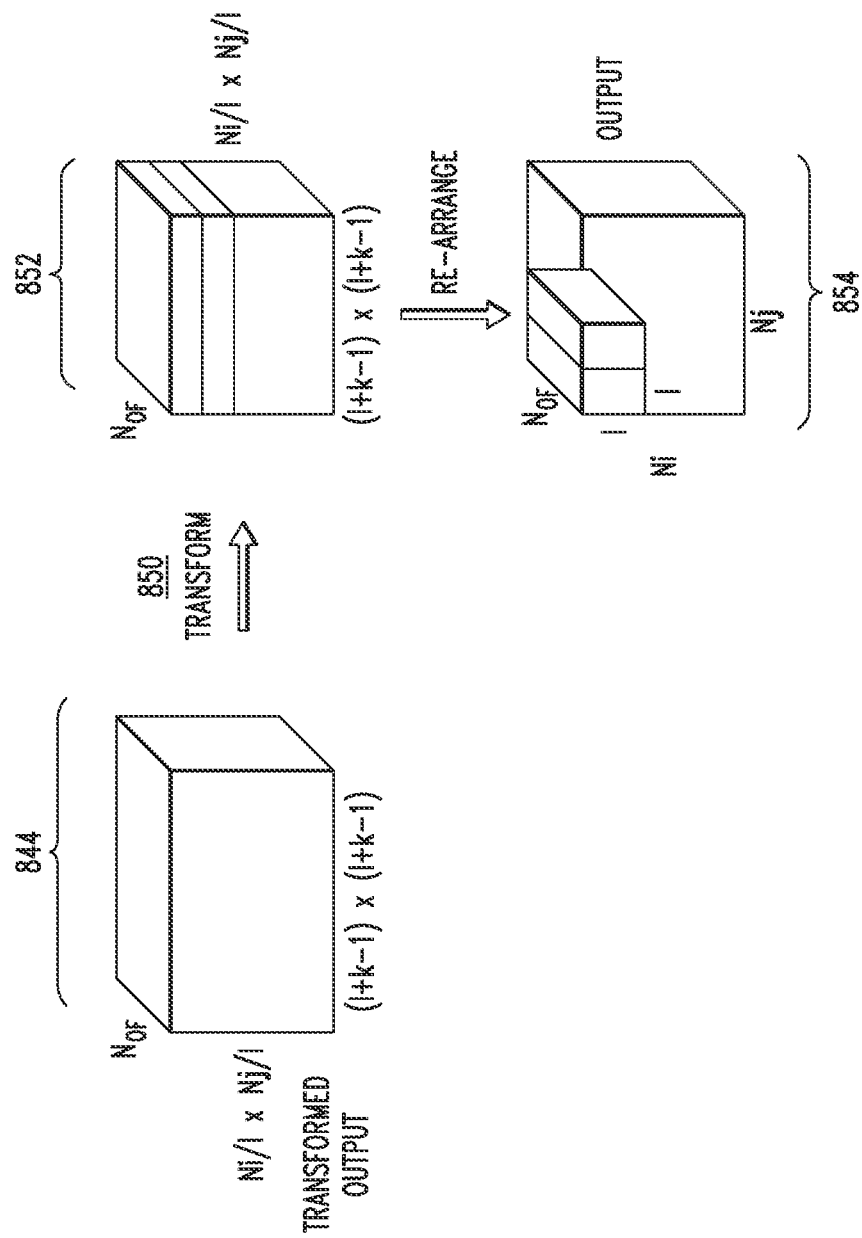

FIG. 8F schematically illustrates a process for applying an inverse transformation function to the transformed output volume to generate an output volume in a spatial domain, according to an exemplary embodiment of the disclosure. In particular, FIG. 8F illustrates a transform output process that is performed starting with the transformed output volume 844 (FIG. 8E). An output transform process 850 is performed on the transformed output volume 844 to generate an intermediate output volume 852. The output transformation process 850 is performed using the output transformation process of Eqn. 3, wherein $O = (AO_t)A^T$. In some embodiments, the output transformation process 850 is performed in the analog domain by performing matrix-vector and/or matrix-matrix multiplication operations using RPU arrays encoded with matrix parameters of the predefined Winograd transformation matrix A and/or $A^T$. As further shown in FIG. 8F, the intermediate output volume 852 is re-arranged to generate an output volume 854 which represents the output volume that would have resulted from a direct convolution. The Winograd convolution coupled with the output transformation process of Eqn. 3, $O = (AO_t)A^T$ enables computation of $I \times I$ (e.g., $2 \times 2$) output tiles simultaneously.

Figure 8G:
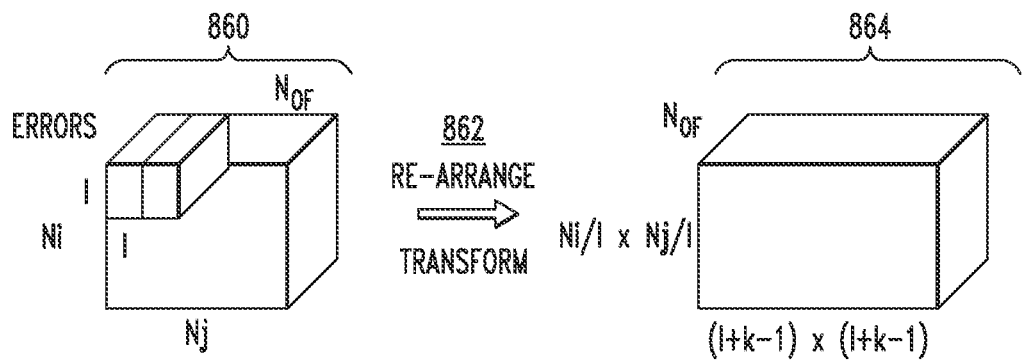

FIG. 8G schematically illustrates a process of transforming an error gradient volume to a transformed error gradient volume which is utilized for performing a backward pass operation of a backpropagation training process, according to an exemplary embodiment of the disclosure. More specifically, 8G schematically illustrates an error gradient volume 860 which is computed for a given iteration of the backpropagation training process. As noted above, during the model training process, the output layer evaluates classification error, and then propagates the classification error back through the layers in the convolutional neural network in a manner similar to the forward pass, which results in a matrix-vectors multiplications operations (e.g., Winograd convolution operations in the transformed space) being performed in the opposite direction.

As schematically shown in FIG. 8G, the error gradient volume 860 is transformed 862 (e.g., transformation/reshaping operations) into a transformed error gradient volume 864, which is backpropagated through the layers of the convolutional neural network layer and utilized to update transformed kernel weights of the transformed kernel matrices stored the RPU arrays of the RPU system. In some embodiments, the transformation process 862 is implemented using a reverse order of the steps of the output transformation process of FIG. 8F which is performed to generate the convolution output volume 854 in the spatial domain.

Figure 8H:
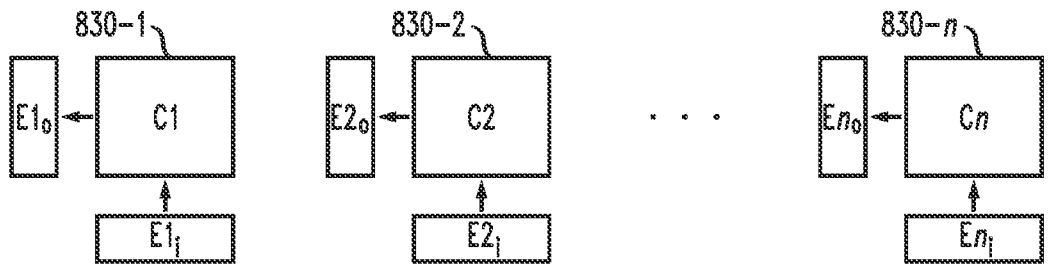

FIG. 8H schematically illustrates a process for performing a backward pass operation to backpropagate the transformed error gradient volume through layers of a convolutional neural network, according to an exemplary embodiment of the disclosure. As noted above, training the convolutional neural network using the SGD process involves computing gradients with respect to the inputs and kernel weights. For a convolutional layer, the gradient with respect to the inputs is a convolution of a next layer's backpropagated error, with a transposed version of the kernel matrices. As such, the gradients can be computed using the same algorithm that is used for forward propagation.

FIG. 8H schematically illustrates a backpropagation process 870 that is performed for the convolutional layer comprising the transformed 2D kernel slices 826-1, 826-2, ..., 826-n stored in the respective RPU crossbar arrays 830-1, 830-2, ..., 830-n (or C1, C2, ..., Cn). As shown in FIG. 8H, the RPU crossbar arrays 830-1, 830-2, ..., 830-n receive as input respective error vectors $E1_{in}$, $E2_{in}$, $En_{in}$, and generate respective output error vectors $E1_O$, $E2_O$, ..., $En_O$, which are backpropagated to the next upstream layer of the convolutional neural network. Assuming the input vectors (from the previous forward pass operation) where input to the rows of the RPU crossbar arrays 830-1, 830-2, ..., 830-n, the process of inputting the transformed error vectors $E1_{in}$, $E2_{in}$ ..., $En_{in}$ to the respective columns of the RPU crossbar arrays 830-1, 830-2, ..., 830-n (as schematically illustrated in FIG. 8H) essentially results in the performing matrix-vector multiplication operations using a transpose of the transformed 2D kernel matrices 826-1, 826-2, ..., 826-n stored in the respective RPU crossbar arrays 830-1, 830-2, ..., 830-n, to thereby generate the respective output error vectors $E1_O$, $E2_O$, ..., $En_O$.

Figure 8I:
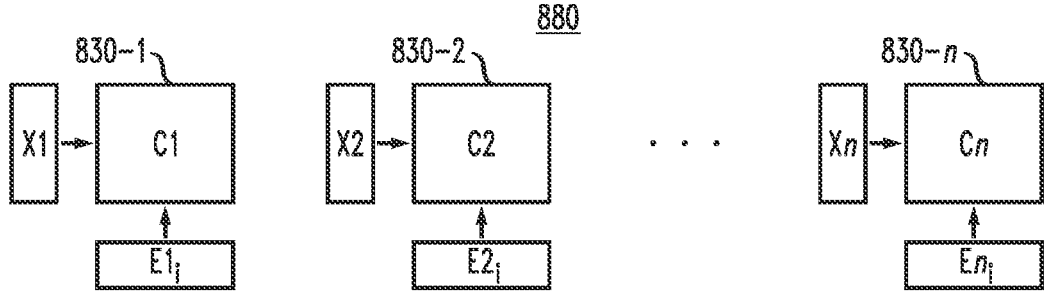

FIG. 8I schematically illustrates a process 880 for updating kernel parameters of the transformed kernels stored in the resistive processing unit crossbar arrays, according to an exemplary embodiment of the disclosure. After completion of the backpropagation process 870 (FIG. 8H) that is performed for the convolutional layer comprising the transformed 2D kernel slices 826-1, 826-2, ..., 826-n stored in the respective RPU crossbar arrays 830-1, 830-2, ..., 830-n (or C1, C2, ..., Cn), a weight update process (as schematically shown in FIG. 8A) is performed to tune the conductance values of the RPU cells of the RPU crossbar arrays 830-1, 830-2, ..., 830-n to update the transformed kernel weight values of the transformed 2D kernel slices 826-1, 826-2, ..., 826-n. A shown in FIG. 8I, the kernel weight updates are performed based on the previous forward-propagated transformed input vectors X1, X2, ..., Xn that were input to the respective RPU crossbar arrays 830-1, 830-2, ..., 830-n, and backward-propagated transformed error vectors $E1_{in}$, $E2_{in}$, ..., $En_{in}$ that were input to the respective RPU crossbar arrays 830-1, 830-2, ..., 830-n, which were previously input to the given RPU array during the forward and backward pass operations.

In general, weight update operation involves updating a transformed kernel matrix in the given RPU array by performing an outer product of the transformed input vectors, and transformed error vectors that are used in the forward and the backward cycles. In particular, implementing the weight update for the given RPU array involves performing a vector-vector outer product operation which consists of a multiplication operation and an incremental weight update to be performed locally in each RPU cell, i.e., $W_{ij}=W_{ij}\pm\Delta W_{min}\Sigma X_i\Lambda X E_i$, where $W_{ij}$ represents the transformed kernel weight value for the $i^{th}$ row and the $j^{th}$ column (for simplicity layer index is omitted), where $X_i$ denotes the transformed input vector and $E_i$ denotes the transformed error vector, and $\pm\Delta W_{min}$ denotes a minimal incremental weight update value which is based on the particular resistive memory elements that are used to implement the RPU arrays.

In some embodiments, to perform the width update process, stochastic translator circuitry in the peripheral circuitry 420 and 430 (FIG. 4) can be utilized to generate stochastic bit streams that represent the transformed input vectors and transformed error vectors. The stochastic bits streams for the vectors $X_i$ and $E_i$ are fed through rows and columns in the RPU array, wherein the conductance of a given RPU cell will change depending on the coincidence of the $X_i$ and $E_i$ stochastic pulse streams input to the given RPU cell. The vector cross product operations for the weight update operation are implemented based on the known concept that coincidence detection (using an AND logic gate operation) of stochastic streams representing real numbers is equivalent to a multiplication operation.

FIG. 9 schematically illustrates methods for performing transformation functions using transformation matrices that are stored in analog resistive processing unit crossbar arrays, according to exemplary embodiments of the disclosure. In particular, FIG. 9 schematically illustrates a process 900-1 for performing a Winograd input transformation process (Eqn. 1) in the analog domain. As shown in FIG. 9, an RPU crossbar array 910 is programed to store the predefined transformation matrix B. Then, analog matrix-vector multiplication operations by inputting vectors of a data matrix I to columns of the RPU crossbar array 910 which to thereby compute resulting output vectors BI which form the matrix-matrix multiplication of BI. Since the RPU crossbar array 910 naturally stores the $B^T$, the computation of $(BI)B^T$ can be performed by inputting vectors BI to the rows of the RPU crossbar array 910 to compute the matrix-matrix multiplication of $(BI)B^T$ in the analog domain.

Furthermore, FIG. 9 schematically illustrates a process 900-2 for performing a Winograd input transformation process (Eqn. 1) in the analog domain using the RPU crossbar array 910 to store the predefined transformation matrix B and another RPU crossbar array 920 to store $B^T$. This process enables a pipeline processing wherein the BI output from the first RPU crossbar array 910 can be processed by the second RPU crossbar array 920 to generate the $(BI)B^T$ result, while the first RPU crossbar array 910 receives and processes a next input vector of I to perform the BI. The process of computing the input transformation in the analog domain and in a pipelined manner increases the computation speed for performing Winograd convolution operations in the transformed space. It is to be understood that the techniques shown in FIG. 9 can be used to perform the Winograd output transformation process (Eqn. 3) in the analog domain, wherein the predefined transformation matrices of A and $A^T$ can be stored in RPU crossbar arrays to accelerate the computation of $O=(AO_t)A^T$ in the analog domain.

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
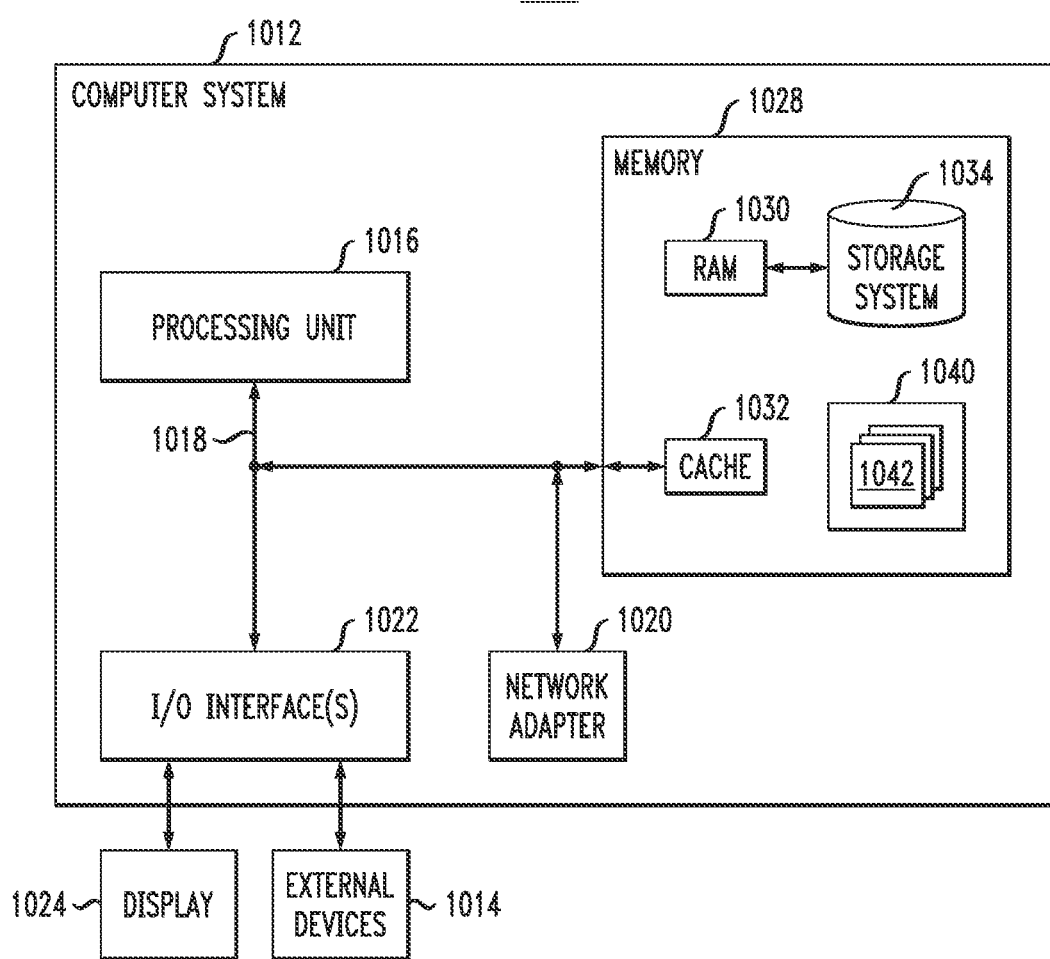
FIG. 10 schematically illustrates an exemplary architecture of a computing node which can host the computing system of FIG. 1, according to an exemplary embodiment of the disclosure.

These concepts are illustrated with reference to FIG. 10, which schematically illustrates an exemplary architecture of a computing node that can host the computing system of FIG. 1, according to an exemplary embodiment of the disclosure. FIG. 10 illustrates a computing node 1000 which comprises a computer system/server 1012, which is operational within numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

In FIG. 10, computer system/server 1012 in computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to the processors 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and non-volatile media, removable and non-removable media.

The system memory 1028 can include computer system readable media in the form of volatile memory, such as random-access memory (RAM) 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As depicted and described herein, memory 1028 may include at least one program product having a set (e.g., at least one) of program modules that are configured to carry out the functions of embodiments of the invention.

The program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the disclosure as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
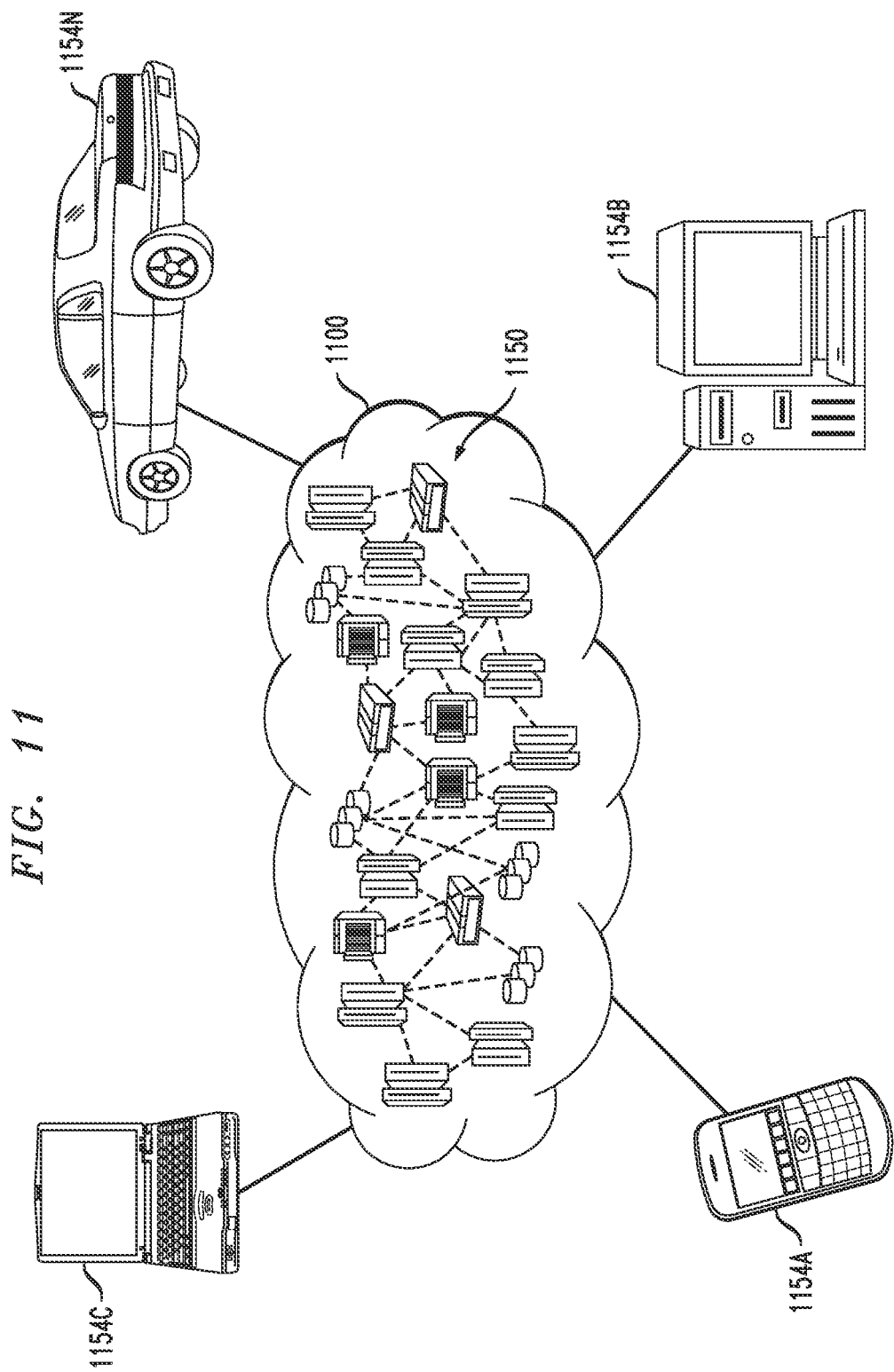
FIG. 11 depicts a cloud computing environment according to an exemplary embodiment of the disclosure.

Referring now to FIG. 11, illustrative cloud computing environment 1100 is depicted. As shown, cloud computing environment 1100 includes one or more cloud computing nodes 1150 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1150 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1150 and cloud computing environment 1100 can communicate with any type of computerized device over any type of network and/or network addressable connection (e.g., using a web browser).

Figure 12:
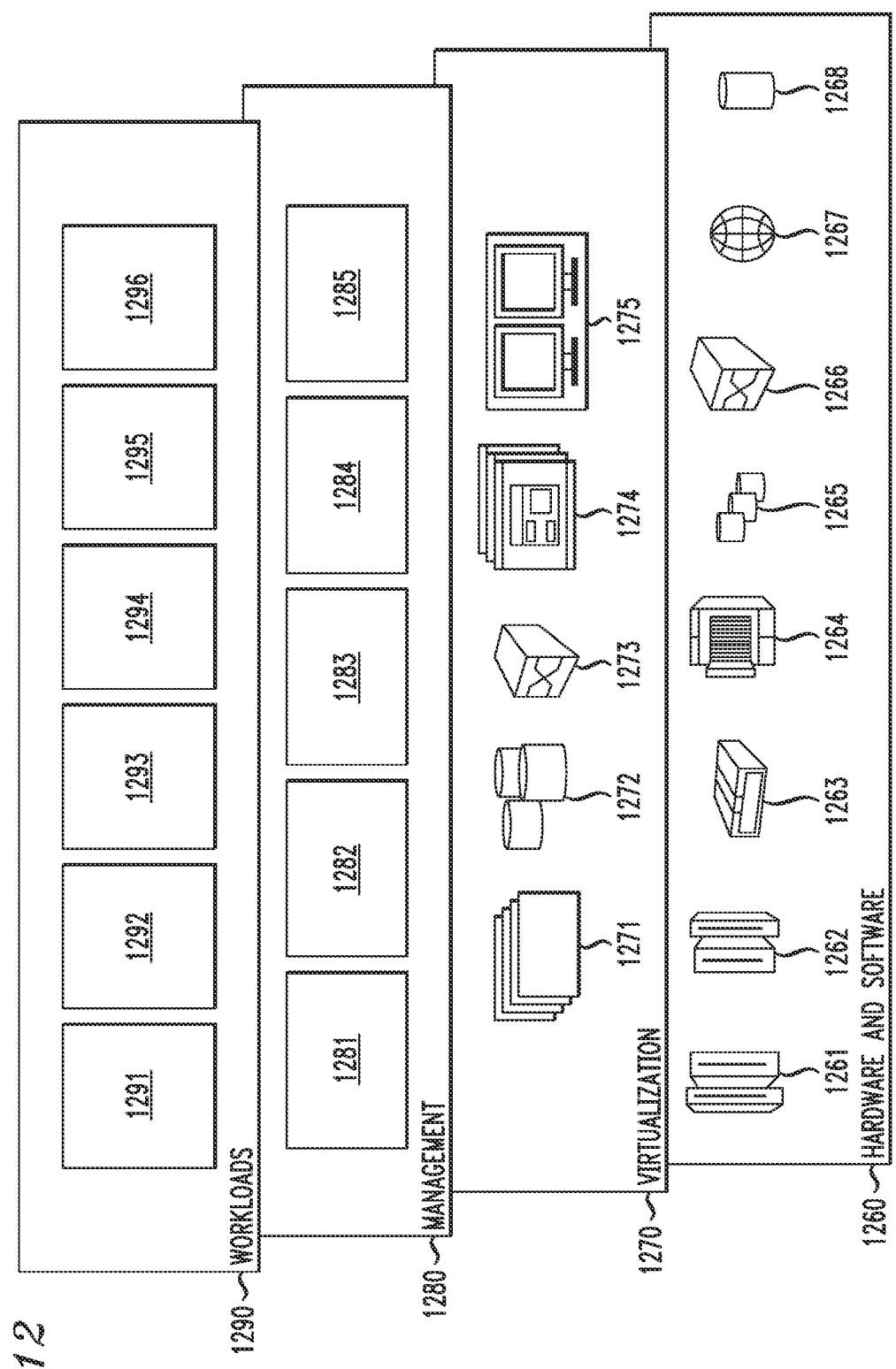
FIG. 12 depicts abstraction model layers according to an exemplary embodiment of the disclosure.

Referring now to FIG. 12, a set of functional abstraction layers provided by cloud computing environment 1100 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized.

Examples of workloads and functions which may be provided from this layer include: mapping and navigation 1291; software development and lifecycle management 1292; virtual classroom education delivery 1293; data analytics processing 1294; transaction processing 1295; and various functions 1296 that are implemented by the exemplary systems and methods as discussed above in conjunction with, e.g., FIGS. 1-9. Furthermore, in some embodiments, the hardware and software layer 1260 would include, e.g., the computing system 100 of FIG. 1 to implement or otherwise support the various workloads and functions 1296 for performing such hardware accelerated computing and analog in-memory computations for training a convolutional neural network using fast filtering functions such as Winograd filtering functions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    an analog resistive processing unit system comprising at least one array of resistive processing unit cells; and
    one or more processors configured to:
    configure the analog resistive processing unit system to implement a convolutional neural network comprising a convolutional layer, wherein the convolutional layer comprises at least one kernel matrix;
    program the at least one array of resistive processing unit cells to store a transformed kernel matrix, wherein the transformed kernel matrix is generated by applying a first transformation process to the at least one kernel matrix using a first predefined transformation matrix; and
    utilize the analog resistive processing unit system to perform an analog convolution operation by performing analog matrix-vector multiplication operations using the transformed kernel matrix and input vectors of a transformed data matrix, to thereby generate a transformed convolution output matrix, wherein the transformed data matrix is generated by applying a second transformation process to a data matrix using a second predefined transformation matrix;
    wherein the one or more processors are configured to generate the transformed data matrix by utilizing the analog resistive processing unit system to perform the second transformation process in an analog domain.

2. The system of claim 1, wherein the analog convolution operation is performed as part of a model training process to train the convolutional neural network implemented on the analog resistive processing unit system.

3. The system of claim 1, wherein the analog convolution operation is performed as part of an inference process that is performed using the convolutional neural network implemented on the analog resistive processing unit system.

4. The system of claim 1, wherein the first and second transformation processes and the analog convolution operation are implemented according to a Winograd filtering function.

5. The system of claim 1, wherein the one or more processors are configured to compute the transformed kernel matrix in a digital domain by a process which comprises multiplying the first predefined transformation matrix and the at least one kernel matrix to generate an intermediate matrix, and multiplying the intermediate matrix and a transpose of first predefined transformation matrix to thereby generate the transformed kernel matrix.

6. The system of claim 1, wherein the convolutional layer comprises a plurality of kernel matrices, and wherein the one or more processors are configured to:
    generate a corresponding transformed kernel matrix for each kernel matrix of the plurality of kernel matrices; and
    store each transformed kernel matrix in a separately addressable region of the at least one array of resistive processing unit cells.

7. The system of claim 6, wherein in utilizing the analog resistive processing unit system to perform the analog convolution operation, the one or more processors are configured perform a pipeline parallel process by applying each input vector of the transformed data matrix to a corresponding one of the transformed kernel matrices stored in the separately addressable regions of the at least one array of resistive processing unit cells.

8. The system of claim 1, wherein in performing the second transformation process in the analog domain, the one or more processors are configured to:
    program the at least one array of resistive processing unit cells to store the second predefined transformation matrix; and
    perform analog matrix-vector multiplication operations by inputting vectors of the data matrix to the stored second predefined transformation matrix.

9. The system of claim 1, wherein in performing the second transformation process in the analog domain, the one or more processors are configured to:
    program the at least one array of resistive processing unit cells to store the second predefined transformation matrix;
    program the at least one array of resistive processing unit cells to store a transpose of the second predefined transformation matrix;
    perform analog matrix-vector multiplication operations by sequentially inputting vectors of the data matrix to the stored second predefined transformation matrix to generate a corresponding sequence of intermediate output vectors; and
    perform analog matrix-vector multiplication operations by inputting the sequence of intermediate output vectors to the stored transpose of the second predefined transformation matrix to thereby generate plurality of output vectors which are combined to generate the transformed data matrix.

10. The system of claim 1, wherein the one or more processors are configured to utilize the analog resistive processing unit system to perform an analog inverse transformation process using a third transformation matrix stored in the at least one array of resistive processing unit cells to thereby convert the transformed convolution output matrix to a convolution output matrix in a spatial domain.

11. The system of claim 1, wherein the one or more processors are configured to utilize the analog resistive processing unit system to generate a transformed error gradient matrix which is backpropagated through layers of the convolutional neural network implemented on the analog resistive processing unit system, wherein the transformed error gradient matrix is utilized to update transformed kernel weight of the transformed kernel matrix stored in the at least one array of resistive processing unit cells.

12. A computer program product, comprising:
one or more computer readable storage media, and program instructions collectively stored on the one or more computer readable storage media, the program instructions comprising:
program instructions to configure an analog resistive processing unit system to implement a convolutional neural network comprising a convolutional layer, wherein the convolutional layer comprises at least one kernel matrix, wherein the analog resistive processing unit system comprises at least one array of resistive processing unit cells; and
program instructions to program the at least one array of resistive processing unit cells to store a transformed kernel matrix, wherein the transformed kernel matrix is generated by applying a first transformation process to the at least one kernel matrix using a first predefined transformation matrix;
program instructions to utilize the analog resistive processing unit system to perform an analog convolution operation by performing analog matrix-vector multiplication operations using the transformed kernel matrix and input vectors of a transformed data matrix, to thereby generate a transformed convolution output matrix, wherein the transformed data matrix is generated by applying a second transformation process to a data matrix using a second predefined transformation matrix; and
program instructions to generate the transformed data matrix by utilizing the analog resistive processing unit system to perform the second transformation process in an analog domain.

13. The computer program product of claim 12, wherein the first and second transformation processes and the analog convolution operation are implemented according to a Winograd filtering function.

14. The computer program product of claim 12, wherein the convolutional layer comprises a plurality of kernel matrices, and further comprising:
program instructions to generate a corresponding transformed kernel matrix for each kernel matrix of the plurality of kernel matrices; and
program instructions to store each transformed kernel matrix in a separately addressable region of the at least one array of resistive processing unit cells.

15. The computer program product of claim 14, wherein the program instructions to utilize the analog resistive processing unit system to perform the analog convolution operation, comprise program instructions to perform a pipeline parallel process by applying each input vector of the transformed data matrix to a corresponding one of the transformed kernel matrices stored in the separately addressable regions of the at least one array of resistive processing unit cells.

16. The computer program product of claim 12, wherein the program instructions to generate the transformed data matrix by utilizing the analog resistive processing unit system to perform the second transformation process in the analog domain, comprise:
program instructions to program the at least one array of resistive processing unit cells to store the second predefined transformation matrix; and
program instructions to perform analog matrix-vector multiplication operations by inputting vectors of the data matrix to the stored second predefined transformation matrix.

17. The computer program product of claim 12, further comprising program instructions to utilize the analog resistive processing unit system to perform an analog inverse transformation process using a third transformation matrix stored in the at least one array of resistive processing unit cells to thereby convert the transformed convolution output matrix to a convolution output matrix in a spatial domain.

18. A neuromorphic computing system, comprising:
an analog resistive processing unit system comprising at least one array of resistive processing unit cells;
wherein the analog resistive processing unit system implements a convolutional neural network comprising a convolutional layer, wherein the convolutional layer comprises at least one kernel matrix;
wherein the at least one array of resistive processing unit cells stores a transformed kernel matrix, wherein the transformed kernel matrix is generated by applying a first transformation process to the at least one kernel matrix using a first predefined transformation matrix;
wherein the analog resistive processing unit system is configured to perform an analog convolution operation by performing analog matrix-vector multiplication operations using the transformed kernel matrix and input vectors of a transformed data matrix, to thereby generate a transformed convolution output matrix, wherein the transformed data matrix is generated by applying a second transformation process to a data matrix using a second predefined transformation matrix; and
wherein the at least one array of resistive processing unit cells stores the second predefined transformation matrix, and the transformed data matrix is generated by utilizing the analog resistive processing unit system performing the second transformation process in an analog domain.

19. The neuromorphic computing system of claim 18, wherein the second transformation process is performed in the analog domain by performing analog matrix-vector multiplication operations by inputting vectors of the data matrix to the stored second predefined transformation matrix.

20. The neuromorphic computing system of claim 18, wherein the second transformation process is performed in the analog domain by:
storing a transpose of the second predefined transformation matrix in the at least one array of resistive processing unit cells;
performing analog matrix-vector multiplication operations by sequentially inputting vectors of the data matrix to the stored second predefined transformation matrix to generate a corresponding sequence of intermediate output vectors; and
performing analog matrix-vector multiplication operations by inputting the sequence of intermediate output vectors to the stored transpose of the second predefined transformation matrix to thereby generate plurality of output vectors which are combined to generate the transformed data matrix.

* * * * *